United States Patent
Nissan

(10) Patent No.: US 12,216,728 B2
(45) Date of Patent: Feb. 4, 2025

(54) CONCURRENT WEBSITE EDITING SYSTEM HAVING CONFLICT HANDLING PROTOCOL

(71) Applicant: WIX.COM LTD., Tel Aviv (IL)

(72) Inventor: Yuval Nissan, Tel Aviv (IL)

(73) Assignee: WIX.COM LTD., Tel Aviv (IL)

( * ) Notice: Subject to any disclaimer, the term of this patent is extended or adjusted under 35 U.S.C. 154(b) by 0 days.

(21) Appl. No.: 18/147,372

(22) Filed: Dec. 28, 2022

(65) Prior Publication Data

US 2023/0267162 A1  Aug. 24, 2023

Related U.S. Application Data

(60) Provisional application No. 63/313,058, filed on Feb. 23, 2022.

(51) Int. Cl.
*G06F 17/00* (2019.01)
*G06F 3/0484* (2022.01)
*G06F 16/958* (2019.01)
*G06F 40/166* (2020.01)

(52) U.S. Cl.
CPC .......... *G06F 16/958* (2019.01); *G06F 3/0484* (2013.01); *G06F 40/166* (2020.01)

(58) Field of Classification Search
CPC .... G06F 16/958; G06F 40/166; G06F 3/0484; G06F 16/93; G06F 40/40; G06F 40/197; G06Q 10/103
See application file for complete search history.

(56) References Cited

U.S. PATENT DOCUMENTS

| | | | | |
|---|---|---|---|---|
| 7,802,179 | B2 * | 9/2010 | Bissonnette | G06F 40/143 |
| | | | | 715/255 |
| 9,805,134 | B2 * | 10/2017 | Goldstein | G06F 40/143 |
| 9,817,804 | B2 | 11/2017 | Goldstein et al. | |
| 9,864,876 | B2 * | 1/2018 | Bjorg | G06F 40/197 |
| 10,073,923 | B2 * | 9/2018 | Koren | G06F 16/9535 |
| 10,176,154 | B2 | 1/2019 | Ben-Aharon et al. | |
| 10,185,703 | B2 | 1/2019 | Abrahami | |
| 10,209,966 | B2 | 2/2019 | Abrahami et al. | |
| 10,430,510 | B2 * | 10/2019 | Evers | G06F 40/174 |
| 10,531,242 | B2 * | 1/2020 | Hosier, Jr. | H04W 4/08 |

(Continued)

FOREIGN PATENT DOCUMENTS

| | | | | | |
|---|---|---|---|---|---|
| CN | | 100472390 C | * | 3/2009 | ........... G06F 16/289 |
| CN | | 103902278 A | * | 7/2014 | |
| WO | WO-2020101745 A1 | | * | 5/2020 | ............... G06F 8/71 |

*Primary Examiner* — Laurie A Ries
(74) *Attorney, Agent, or Firm* — Alston & Bird LLP

(57) ABSTRACT

Methods, apparatuses, systems, and computer program products are disclosed for implementing network transactional-based concurrent editing of a document. An exemplary system includes a transaction assignment module configured to receive at least one object change set originating from at least one change interface session, wherein the at least one object change set is associated with a selected document, parse the at least one object change set to identify one or more objects, one or more object changes, and one or more object groups in the at least one object change set, apply a transaction assignment protocol to the one or more object groups to define at least one object change transaction, and output the at least one object change transaction to a transaction approval determination module.

20 Claims, 11 Drawing Sheets

(56) References Cited

U.S. PATENT DOCUMENTS

| | | | |
|---|---|---|---|
| 11,003,324 B1* | 5/2021 | Abrego | G06Q 10/10 |
| 2005/0027651 A1* | 2/2005 | DeVault | G06Q 20/10 |
| | | | 705/38 |
| 2006/0123348 A1* | 6/2006 | Ross | G06F 40/174 |
| | | | 707/E17.107 |
| 2008/0189240 A1* | 8/2008 | Mullins | G06F 16/25 |
| 2012/0317214 A1* | 12/2012 | Brunner | G06Q 10/107 |
| | | | 709/204 |
| 2014/0082502 A1* | 3/2014 | Rubel | G06F 3/0346 |
| | | | 715/733 |
| 2014/0172829 A1* | 6/2014 | Adam | G06F 16/219 |
| | | | 707/722 |
| 2014/0214784 A1* | 7/2014 | Seo | G06F 16/245 |
| | | | 707/703 |
| 2015/0163206 A1* | 6/2015 | McCarthy | H04L 63/104 |
| | | | 726/4 |
| 2015/0178275 A1* | 6/2015 | Baldwin | G06F 40/197 |
| | | | 707/638 |
| 2015/0227533 A1* | 8/2015 | Goldstein | G06F 40/143 |
| | | | 707/661 |
| 2016/0255139 A1* | 9/2016 | Rathod | H04N 1/32101 |
| | | | 709/203 |
| 2017/0142076 A1* | 5/2017 | Ford | H04L 63/083 |
| 2017/0277905 A1* | 9/2017 | Bjorg | G06F 40/197 |
| 2018/0144016 A1* | 5/2018 | Bestfleisch | G06F 11/1451 |
| 2018/0239959 A1* | 8/2018 | Bui | G06F 16/93 |
| 2020/0089783 A1* | 3/2020 | Horsman | G06F 16/164 |
| 2020/0320105 A1* | 10/2020 | Korpman | G06F 16/986 |
| 2022/0292073 A1* | 9/2022 | Macintosh | G06F 16/2365 |
| 2022/0318231 A1* | 10/2022 | Franz | G06F 16/258 |

\* cited by examiner

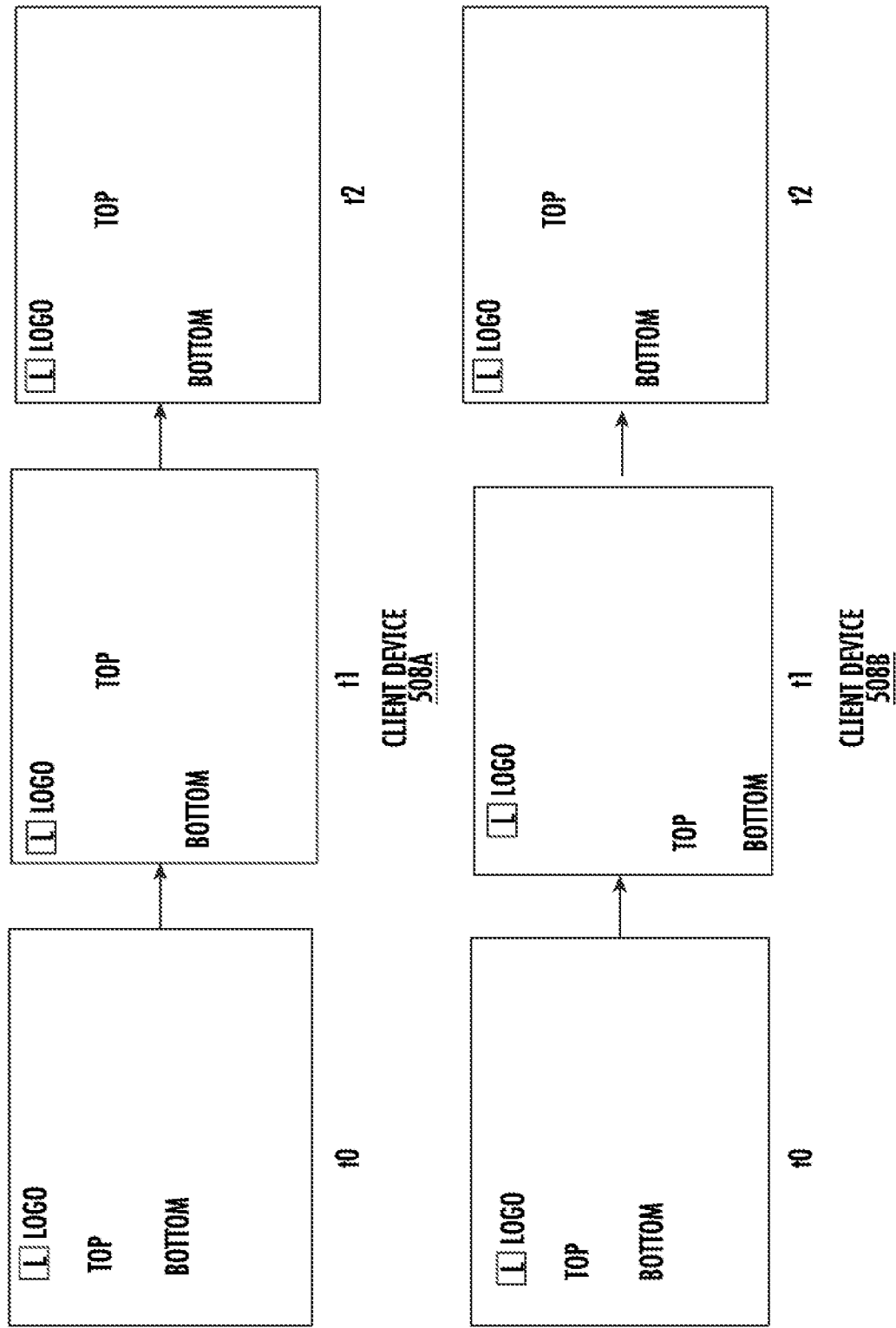

CONCURRENT WEBSITE EDITING SYSTEM HAVING CONFLICT HANDLING PROTOCOL

CROSS-REFERENCE TO RELATED APPLICATION(S)

This application claims priority to and the benefit of U.S. Provisional Patent Application No. 63/313,058, filed Feb. 23, 2022, which is incorporated by reference herein in its entirety.

TECHNOLOGICAL FIELD

Example embodiments of the present disclosure relate generally to concurrent editing technologies and, more particularly, to a system, apparatus, method, and computer program product for implementing network transactional-based concurrent editing.

BACKGROUND

Various document management systems provide tools allowing users to edit, revise, and/or change webpage interfaces and related interface documents in a variety of different environments. However, efficient management and implementation of concurrent and/or conflicting edits, revisions, and/or changes to shared documents in such systems is technologically complex and fraught with issues. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved systems configured for implementing network transactional-based concurrent editing of a document. In accordance with one exemplary embodiment of the present disclosure, a system for implementing network transactional-based concurrent editing of a document by two or more users is provided, the system comprising one or more transaction assignment modules configured to parse a first object change set originating from a first user device and a second object change set originating from a second user device to define at least two object change transactions, wherein the first object change set and the second object change set are associated with a selected document, the selected document associated with a data model comprising one or more objects, a transaction approval determination module configured to identify at least one of the at least two object change transactions as an approved object change transaction based on application of a conflict handling protocol, and an object change update coordinator configured to update the data model of the selected document with the at least one approved object change transaction.

In accordance with another exemplary embodiment, a system for implementing network transactional-based concurrent editing of a document is provided, the system comprising a transaction assignment module configured to receive at least one object change set originating from at least one change interface session, wherein the at least one object change set is associated with a selected document, parse the at least one object change set to identify one or more objects, one or more object changes, and one or more object groups in the at least one object change set, apply a transaction assignment protocol to the one or more object groups to define at least one object change transaction, and output the at least one object change transaction to a transaction approval determination module.

In accordance with another exemplary embodiment, an apparatus for implementing network transactional-based concurrent editing of a document is provided, the apparatus comprising at least one processor, and at least one non-transitory memory including program code, the at least one non-transitory memory and the program code configured to, with the at least one processor, cause the apparatus to cause rendering of a selected document to a document editing interface, detect a candidate change to a component of the selected document, update the document editing interface to replace the component with a candidate changed component, the candidate changed component reflecting application of the candidate change to the component, and update the document editing interface to replace the candidate changed component with an approved changed component triggered following application of a conflict handling protocol, wherein the approved changed component embodies an approved change to the component of the selected document that differs from the candidate change.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1A:
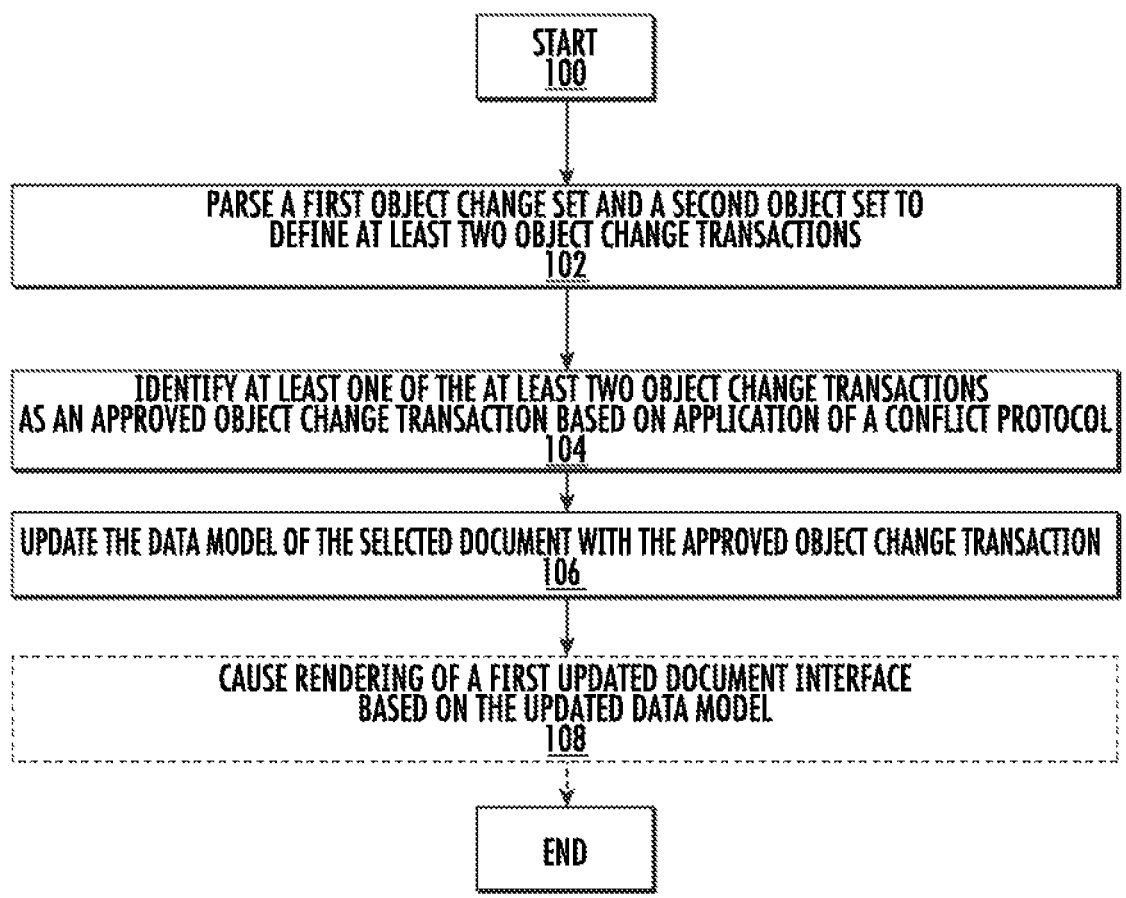
Figure 1B:
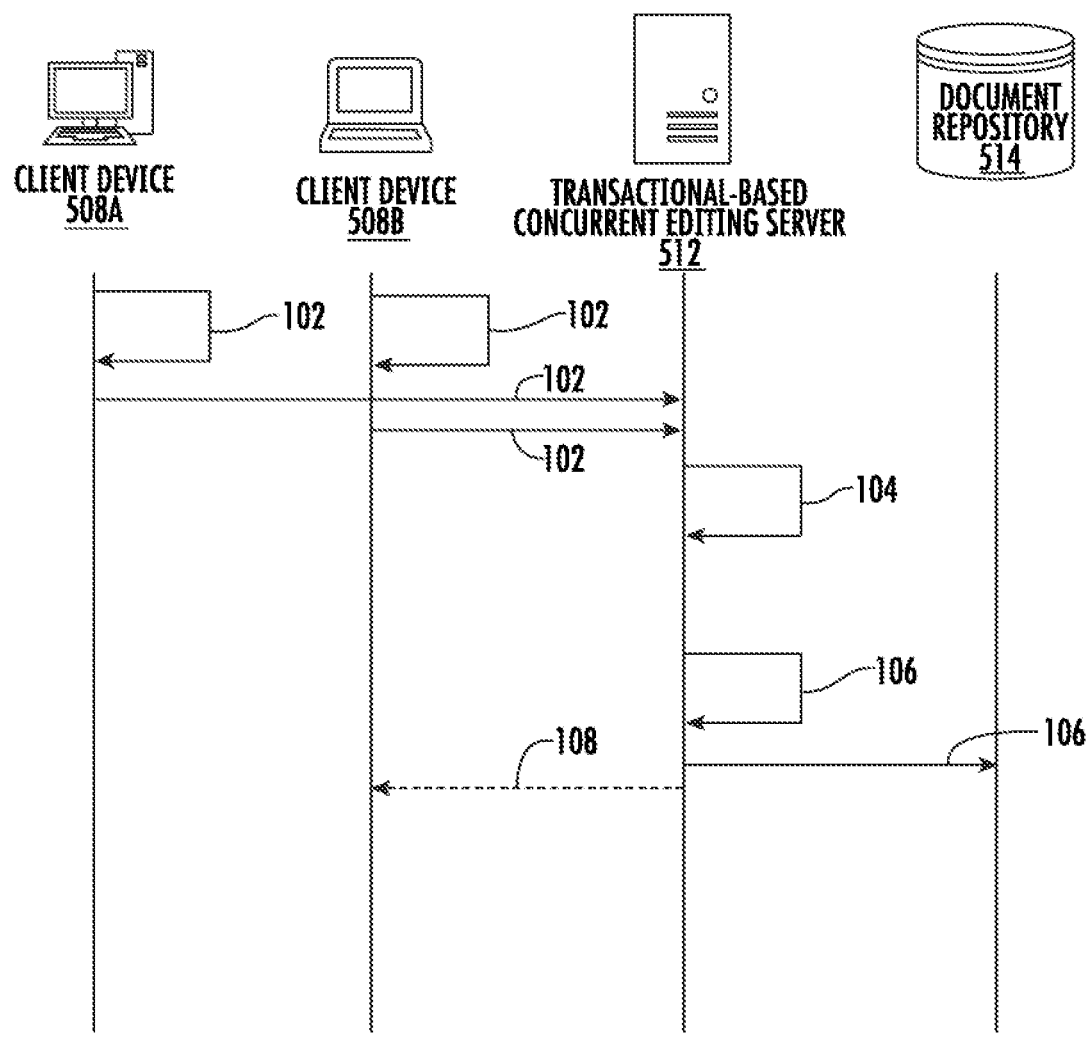
Figure 2A:
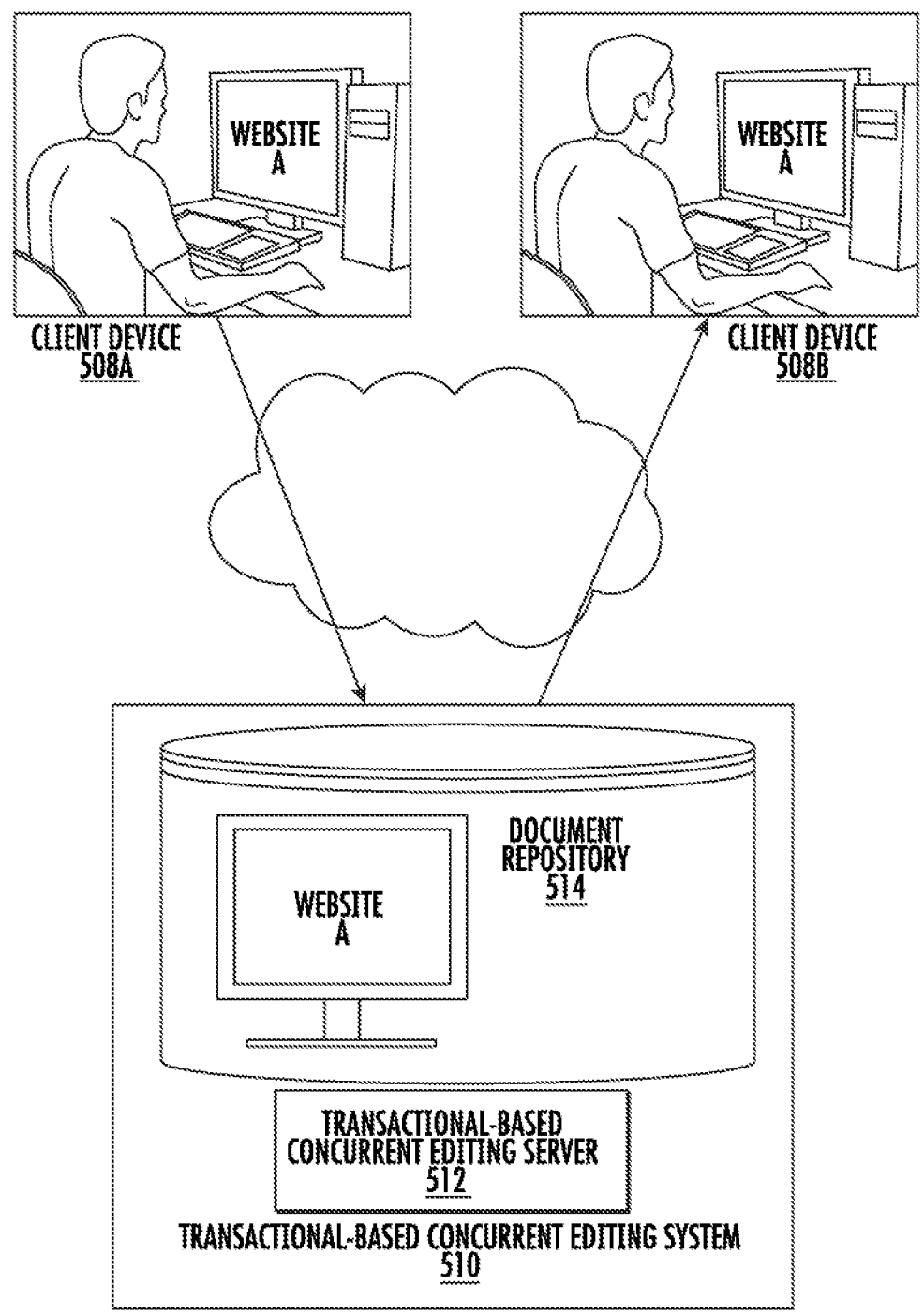
Figure 3:
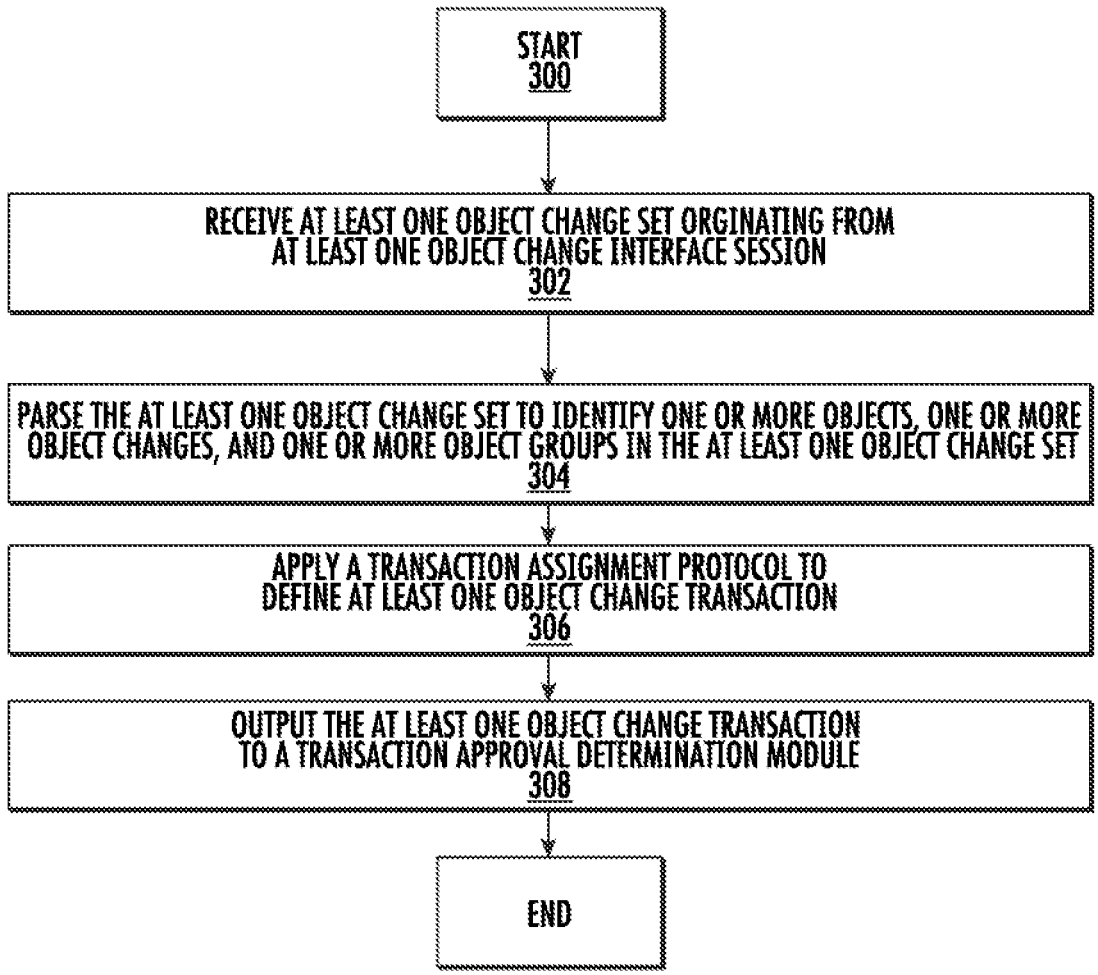
Figure 4:
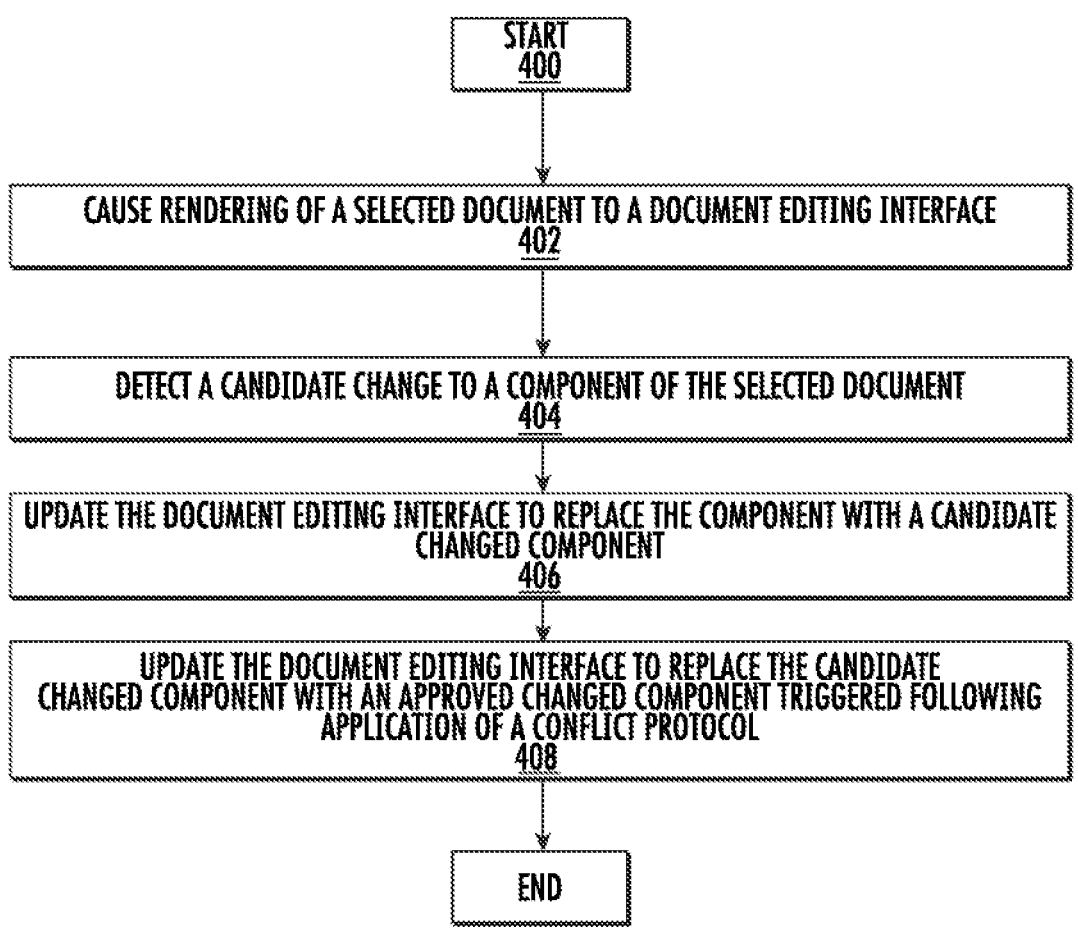
Figure 5:
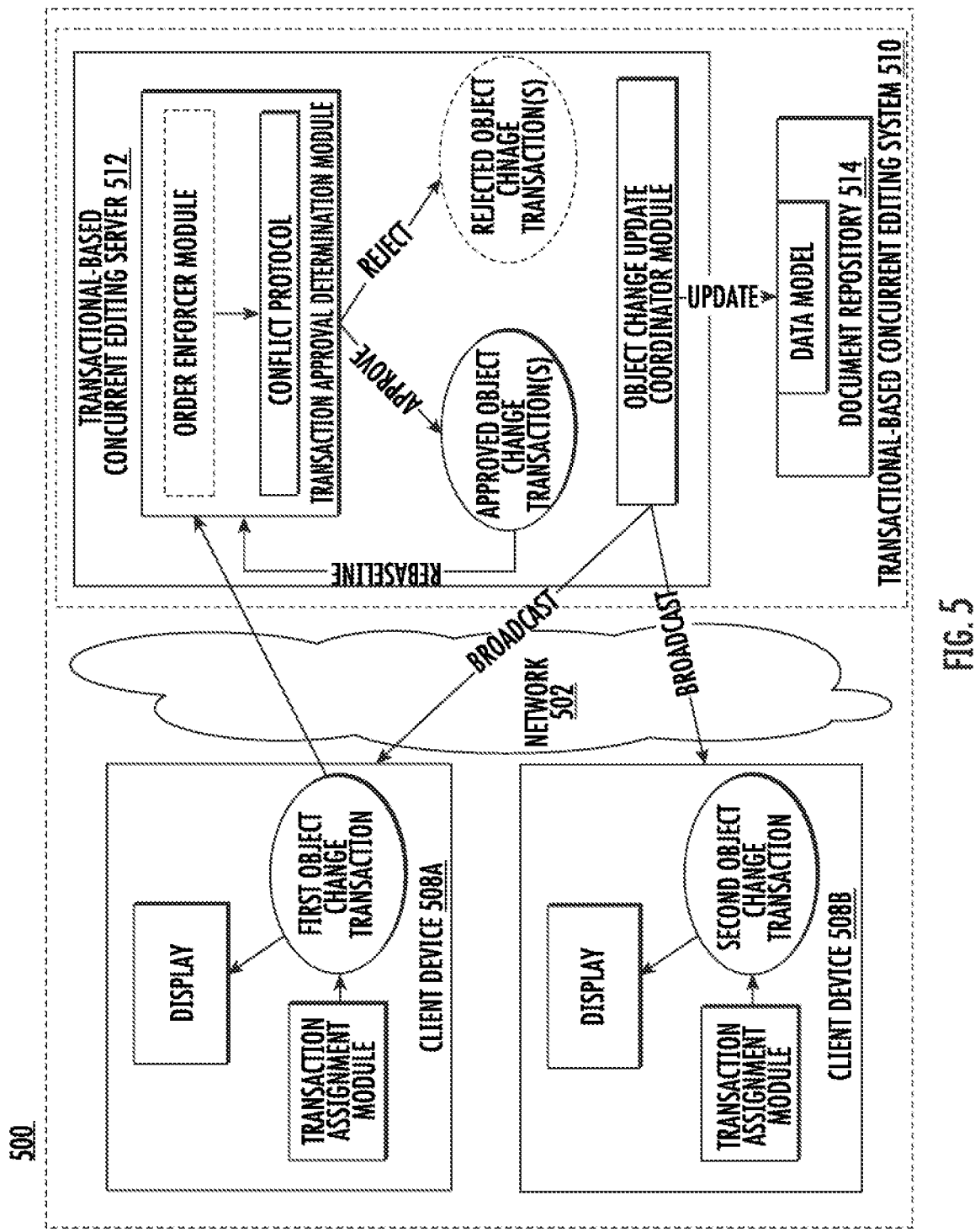
Figure 6:
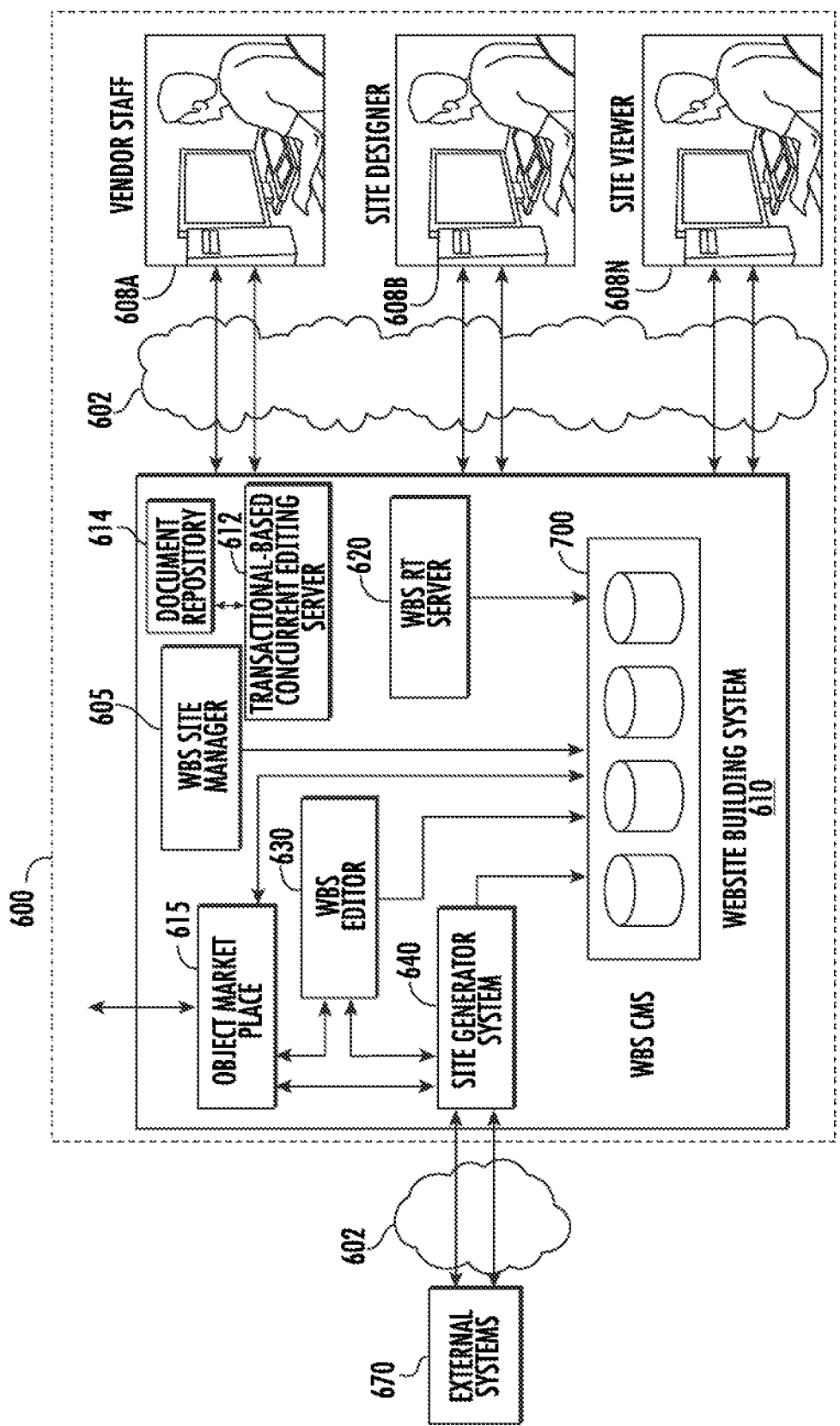
Figure 7:
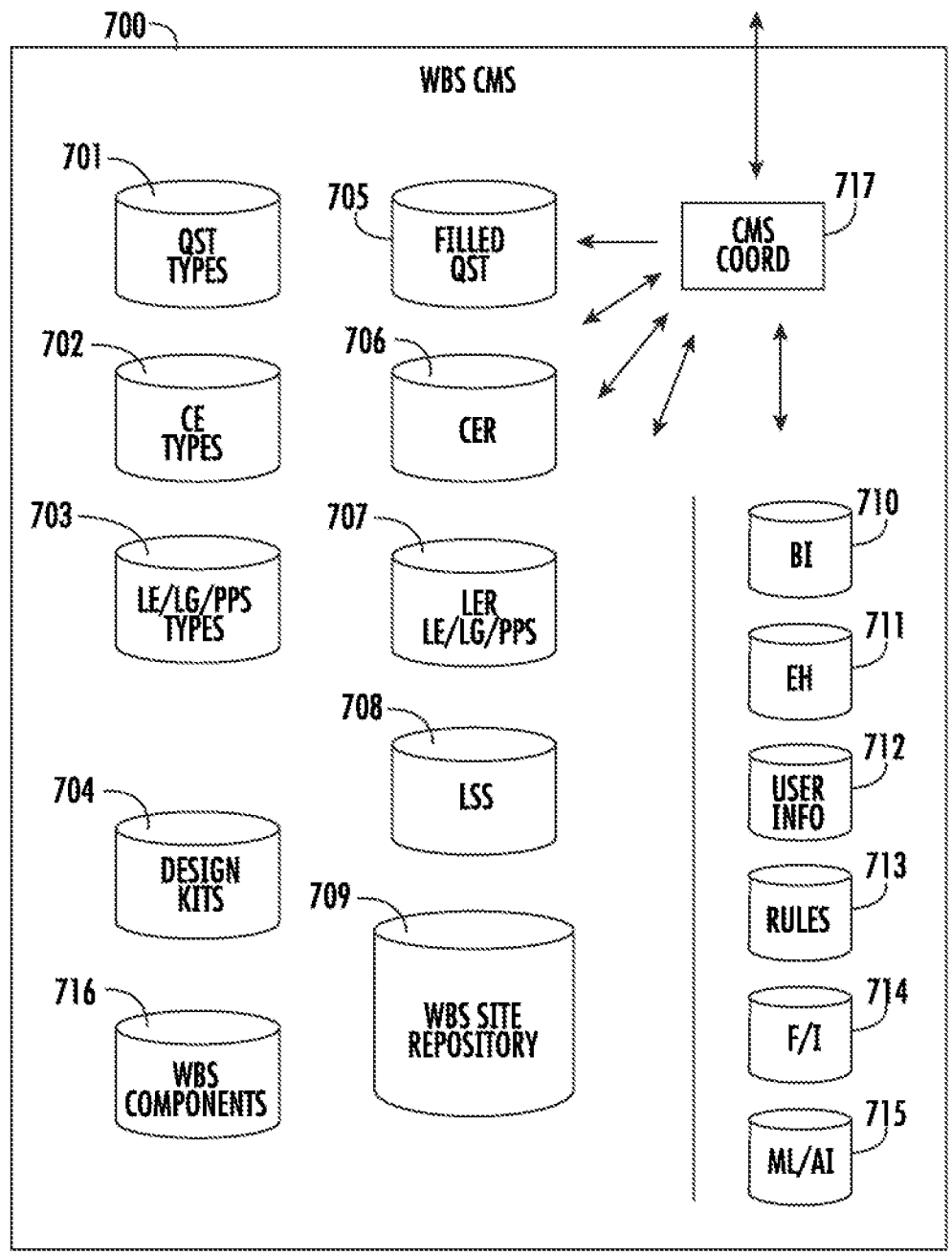
Figure 8:
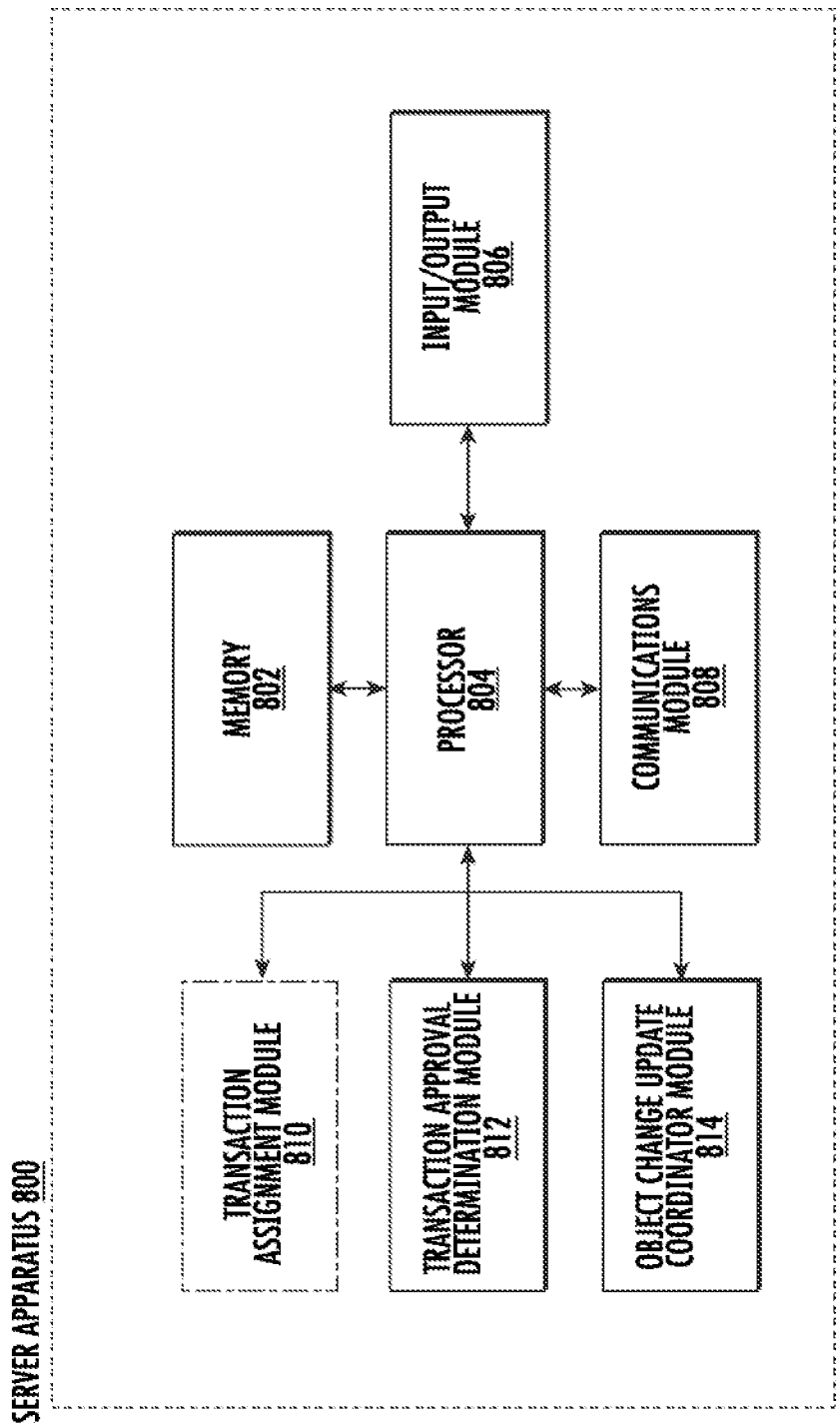
Figure 9:
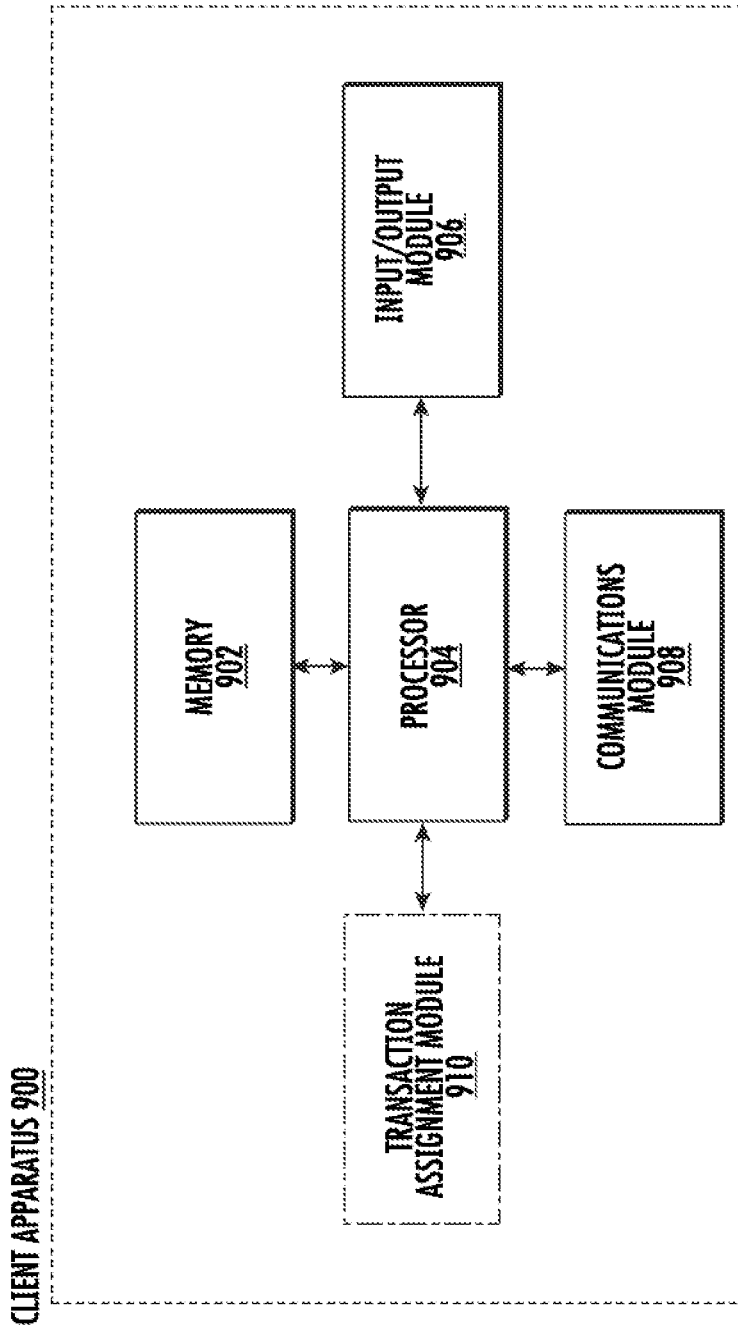

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIG. 1A is a flowchart for implementing network transactional-based concurrent editing operations in accordance with some example embodiments described herein;

FIG. 1B is a signal diagram of an example data flow in accordance with some example embodiments described herein;

FIG. 2A illustrates a schematic block diagram of two users concurrently editing a document in accordance with some example embodiments described herein;

FIG. 2B illustrates example user-facing interfaces demonstrating network transactional-based concurrent editing in accordance with some example embodiments described herein;

FIG. 3 is a flowchart for defining an object change transaction in accordance with some example embodiments described herein;

FIG. 4 is a flowchart for updating a document editing interface in accordance with some example embodiments described herein;

FIG. 5 illustrates a schematic block diagram of example components of an example transaction-based concurrent editing environment in accordance with some example embodiments described herein;

FIG. 6 illustrates a schematic block diagram of example components of an example website building system in accordance with some example embodiments described herein;

FIG. 7 illustrates a schematic block diagram of example repositories of an example content management system of website building system in accordance with some example embodiments described herein;

FIG. 8 is a schematic block diagram of example modules for use in an example server apparatus in accordance with some example embodiments described herein; and FIG. 9 is a schematic block diagram of example modules for use in an example client apparatus in accordance with some example embodiments described herein.

DETAILED DESCRIPTION

One or more example embodiments now will be more fully hereinafter described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly, this disclosure should not be construed as limited to the embodiments set forth herein. Rather, these embodiments are provided so that this disclosure will satisfy applicable legal requirements. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Overview

Enabling concurrent or simultaneous editing to the same webpage, source document, or data file by multiple users is technologically complex and fraught with issues. For example, some edits may be conflicting such as when a first user modifies an element of a document (e.g., or other data stored in a repository, database, CMS, etc.) in a different manner than a second user modifies the same element. In addition, often times, various elements of the document may be interdependent or grouped such that the edited element is associated with one or a multitude of other elements that may be affected by the proposed edit. A common example of such element interdependency can be found in website design where each element presented on webpage is often part of a complex hierarchical data model that establishes groupings of interface elements that can be critical to creating a consistent look and feel for the website even when displayed across a myriad of client devices. In some examples, element interdependency may be inferred based on an analysis of attributes associated with the elements, such as the geometry, content, semantics, type, dynamic layout anchors, and/or other attributes of the elements in the document. For example, an image type element and a text type element may be closely arranged such that a "picture and caption" interdependency is inferred or determined at run-time based on an analysis of the elements without such interdependency having been previously explicitly specified.

Edits made to one element of a group of interdependent elements by a first user can cause a conflict with concurrent edits to the same group of interdependent elements by a second user even if a different element of the group is edited. Grouped elements may be considered collectively along with any additional interdependencies or logical relationships, such as predefined interdependencies established by a data model (e.g., hierarchical or otherwise) or inferred interdependent relationships of elements as described hereinabove.

To overcome these problems and others, various embodiments of the present disclosure are directed to systems that are configured to implement network transactional-based concurrent editing of a document(s), page(s), element(s), and/or the like by multiple users at the same (or similar) time, even when the document(s), page(s), or element(s) are part of complex data models. The inventors have determined that it would be desirable and advantageous to programmatically leverage the logic and rules defining interdependencies to group together one or more object changes to objects in an object change transaction and have such group of object changes committed fully or not at all based on application of a conflict handling protocol.

Such network transactional-based concurrent editing advantageously preserves the context of intended changes consistent with the design architecture of the website or user interface. Edits are made or not by comparing object change transactions that are defined and assigned at least partially based on a broader grouping architecture of the edited document.

Grouping edits into object change transactions for comparison and conflict resolution reduces computational load on the system and produces a lower latency user experience. Moreover, processing efficiency is improved by implementing changes at the grouped transaction-level as opposed to implementing discrete changes for each and every edit. For example, implementing changes at the grouped transaction-level results in improved loading of the object changes into memory. Edits to elements can be made in the context of the data model (e.g., made relative to parent and/or child elements in a hierarchical data model) and each object change transaction can be programmatically labeled with metadata to preserve the business or other context for the requested edit. For example, it is beneficial for debugging purposes that the business or other context of a requested edit is preserved such that requested edits corresponding to multiple changes can be implemented and/or removed in totality.

Definitions

The term "transactional-based concurrent editing system" refers to a software platform(s) and associated hardware that is configured to support, maintain, and manage network transactional-based concurrent editing of selected documents (e.g., a webpage, graphical user interface, online document, etc.) and all associated functionalities. Example transactional-based concurrent editing systems comprise supporting server(s), repositor(ies), and client device(s), and in some embodiments, are further configured to engage with external resources and external applications. In some embodiments, the transactional-based concurrent editing system is a standalone system. In other embodiments, the transactional-based concurrent editing system is embedded inside of a larger editing system. In certain embodiments, the transactional-based concurrent editing system is associated with a visual design system and further still, in some embodiments, the visual design system is one or more of a document building system, a website building system, or a software application building system.

The term "transactional-based concurrent editing server" refers to a software platform and associated hardware that is configured to manage the various object data, object change data, object transactions and some or all of the associated transactional-based concurrent editing functionality of the transactional-based concurrent editing system. The transactional-based concurrent editing server is accessible via one or more computing devices, is configured to receive various data (e.g., object data, object change data, document identifier(s), object identifier(s), user identifier(s), grouping protocol identifier(s), assignment protocol identifier(s), transaction identifier(s), object signature(s), and/or the like), and access one or more data repositories such as a document repository. The functionality of the transactional-based concurrent editing server may be provided via a single server or collection of servers having a common functionality, or the functionality of the transactional-based concurrent editing server may be segmented among a plurality of servers, collections of servers (e.g., a cloud networking environment, microservices, and/or the like) and/or a plurality of clients performing subsets of the described functionality of the transactional-based concurrent editing server. In some embodiments, some or all of the functionality of the transactional-based concurrent editing server may be provided via blockchain technology. For example, tracking and/or implementation of the object change transactions may be managed by a distributed ledger such as a blockchain, or other distributed/federated consensus or coordination mechanism, such that the functionality is not performed by any dedicated single server or plurality of servers.

The term "document" refers to a data entity comprising a collection of data that is stored in a shared repository such that it is accessible for editing by two or more users concurrently. For example, a document comprises one or more of website(s) (e.g., full website, website sub-section(s), section(s) of one or more website pages, website(s) designed for desktop computer viewing, website(s) designed for mobile and/or tablets, blogs, portals, and/or the like), application(s), electronic mail(s), electronic newsletters, spreadsheet(s), text document(s), and/or the like. In some embodiments, a document comprises a data model comprising one or more objects. In some embodiments, a document is configured for display to a user interface, such as at a client device.

The terms "object" or "component" refers to an electronic data entity or digital content entity defined by one or more properties or attributes. Non-limiting exemplary attributes of an object include content, position, color, size, and/or format.

The term "object data" refers to one or more items of data related to an object defined with a document that is accessible within a transactional-based concurrent editing system, including but not limited to, object identifier(s), document identifier(s), object signature(s), content field(s), position field(s), color field(s), size field(s), formatting field(s), user field(s), timestamp field(s), object change data, and/or the like.

The term "object identifier" refers to one or more items of data by which an object may be uniquely identified within a transactional-based concurrent editing system. For example, an object identifier may comprise one or more of ASCII text, encryption keys, identification certificates, a pointer, an IP address, a URL, a MAC address, a memory address, an object signature, a HASH value, or other unique identifier, or combinations thereof.

The term "object change set" refers to a collection or culling of one or more objects originating from an editing session of the transactional-based concurrent editing system, such as might be executed via a software application running on a client device. In some embodiments, an object change set is generated by the client device to identify one or more changes to objects of a selected document that are input by a user. In some embodiments, a transaction assignment module defines one or more object change transactions based on an analysis of an object change set.

The term "object change transaction" refers to a defined unit of change applicable to a data model of a document within a transactional-based concurrent editing system. In some embodiments, a transaction assignment module, such as might be executed via a software application running on a client device, defines one or more object change transactions based on an analysis of an object change set, on the structure of the document, and/or on an explicit user definition (i.e., the user explicitly identifying certain object changes to be handled together). The unit of change defined by an object change transaction is applied or rejected in its entirety. An object change transaction can be transmitted from one computing entity to another in the transactional-based concurrent editing system. In various embodiments, an object change transaction only contains the one or more objects that have been changed. In some embodiments, an object change transaction contains all objects associated with an object change, including other objects of an affected group.

The term "object change transaction state" refers to one or more items of data defining a state of the object change transaction within a transaction-based concurrent editing system. An object change transaction can be any one of a variety of transaction states, including but not limited to, tentative state, pending state, approved state, or rejected state. In some embodiments, an object change transaction state is relative to the computing entity in which the object change transaction is associated. For example, an object change transaction may be assigned a tentative object change transaction state by the computing entity that defines the object change transaction (e.g., a first client device defining the object change transaction before sending the object change transaction to a transactional-based concurrent editing server). Object change transactions received by a transactional-based concurrent editing server may assign all incoming or received object change transactions as a tentative object change transaction state and/or pending object change transaction state, as in some embodiments, the transactional-based concurrent editing server is the computing entity that performs the approval process. In an example wherein the transactional-based concurrent editing server approves an object change transaction, the transactional-based concurrent editing server may assign an approved object change transaction state to the selected object change transaction. In such an example, at such point in time, the object change transaction is still associated with a tentative object change transaction state by the first client device while the same object change transaction is associated with an approved object change transaction state at the transactional-based concurrent editing server. The transactional-based concurrent editing server may broadcast the object change transaction with the approved object change transaction state to all client devices associated with the underlying document. In such an example, the first client device may update the tentative object change transaction state associated with the object change transaction to reflect the approved object change transaction state while a second client device receives and applies the object change transaction with the approved object change transaction state.

The term "document repository" refers to a location, such as a database stored on a memory device, which is accessible by one or more computing devices for retrieval and storage of documents and other data associated with network transactional-based concurrent editing. A document repository may be part of or accessible to a monolithic server or part of cloud storage. An example document repository may include one or more of object data, object change data, document identifier(s), object identifier(s), user identifier(s), transaction identifier(s), object signature(s), baselined data and values, and/or the like. The document repository may be a dedicated device and/or a part of a larger repository. In some embodiments, the documents repository is encrypted in order to limit unauthorized access of such resource data.

The terms "client device", "computing device", "user device", and the like may be used interchangeably to refer to computer hardware that is configured (either physically or by the execution of software) to access one or more of an application, service, or repository made available by a server and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user to the transactional-based concurrent editing system (e.g., transactional-based concurrent editing server).

The terms "data," "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise website editing services, document editing services, word processors, spreadsheet applications, accounting applications, web browsers, email clients, media players, file viewers, collaborative document management services, videogames, audio-video conferencing, and photo/video editors.

In some embodiments, an application is a cloud product. When associated with a client device, such as a mobile device, communication with hardware and software modules executing outside of the application is typically provided via application programming interfaces (APIs) provided by the mobile device operating system.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of qualitative assessment or quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present disclosure and may be included in more than one embodiment of the present disclosure (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example Transactional-Based Concurrent Editing Methods

Example embodiments of the present disclosure may proceed to implement network transactional-based concurrent editing in a number of ways. Accordingly, various processes in accordance with the present disclosure are described herein. Each method or process described herein may include any number of operational blocks defining the process and/or a portion thereof. It should be appreciated that in some embodiments the various processes and/or sub-processes described herein may be combined in any manner, such that the embodiment is configured to perform each aspect of the various processes in combination, in parallel and/or serially. In some embodiments, at least one additional and/or at least one alternative operation is performed in one or more of the described processes, and/or at least one operation is removed from one or more of the described processes.

Additionally, optional operations may be depicted in the processes utilizing dashed (or "broken") lines. In this regard, it should be appreciated that the processes described herein are examples only and the scope of the disclosure is not limited to the exact operations depicted and described, and the depicted and described operations should not limit the scope and spirit of the embodiments described herein and covered in the appended claims.

In some embodiments, one or more of the devices, apparatuses, modules, and/or systems disclosed herein is configured to perform any number and/or combination of the processes described herein, whether alone or in combination. Each of the described processes may be altered or implemented in any of a myriad of ways without departing from the spirit of the present disclosure. In some embodiments, for example, the processes are embodied in computer-implemented methods executable by any of a myriad of computing device implementations, or combinations thereof, described herein, including by a client device 508, a transactional-based concurrent editing system 510, a transactional-based concurrent editing server 512, and/or the like as described herein.

FIG. 1A is a flowchart broadly illustrating a series of operations or process blocks that are executed or performed by a system or apparatus to implement network transactional-based concurrent editing of a selected document by two or more users in accordance with some example embodiments of the present disclosure. The operations illustrated in FIG. 1A may, for example, be performed by, with the assistance of, and/or under the control of a server apparatus 800 (e.g., transactional-based concurrent editing system 510, transactional-based concurrent editing server 512, or the like) shown in FIG. 8 and/or a client apparatus 900 (e.g., client device 508) shown in FIG. 9, as described above. In this regard, performance of the operations may invoke one or more of memory 802, 902, processor 804, 904, input/output module 806, 906, communications module 808, 908, transaction assignment module 810, 910, transaction approval determination module 812, and/or object change update coordinator module 814.

In the embodiment illustrated in FIG. 1A, the flowchart illustrates method 100 which includes parsing a first object change set and a second object change set to define at least two object change transactions at Block 102. For example, in some embodiments, a first client device 508A, embodied by client apparatus 900, may include means, such as memory 902, processor 904, input/output module 906, communications module 908, transaction assignment module 910, and/or the like, which are collectively configured to parse the first object change set to define a first object change transaction. A second client device 508B, embodied by client apparatus 900, may include means, such as memory 902, processor 904, input/output module 906, transaction assignment module 910, and/or the like, which are collectively configured to parse the second object change set to define a second object change transaction.

In the depicted embodiments, the transaction assignment module 910 forms part of client-side software applications running on the first and second client devices 508A-B. In a further example, it is contemplated by this disclosure that some or all of the functionality of transaction assignment module 910 may optionally be performed by server-side software executed by a server and the disclosure is not limited to the specifically-identified arrangement of software executed by client devices 508A-B. In some embodiments, the transaction assignment module 910 may be performed on a separate server than the transactional-based concurrent editing server performing the approval determination and conflict handling protocol application. In such embodiments, the client devices 508A-B are configured to transmit the respective first and second object change sets to a server configured to perform the object transaction definition functionality (e.g., a server comprising and/or executing a transaction assignment module 810).

In the depicted embodiment, defining at least two object change transactions at Block 102 comprises defining a first object change transaction for the first object change set and a second object change transaction for the second object change set. The first object change set corresponds to one or more object changes to a selected document made by a first user using the first client device 508A. The second object change set corresponds to one or more object changes to the selected document made by a second user using the second client device 508B. An example processing for defining object change transactions based on at least one object change set is described in more detail below with respect to FIG. 3. In various embodiments, each document that is selected for editing is associated with a data model comprising a plurality of objects. Each of the first object change sets and the second object change sets correspond to object changes made to one or more of the plurality of objects of a selected document. In some embodiments, the plurality of objects have a defined relationship.

In various embodiments, the one or more objects of the data model may comprise components, containers, or a combination thereof, which are configured within a document hierarchical data structure. In some embodiments, the document hierarchical data structure comprises one or more of a tree-structured data structure, a graph data structure, a referential table, an object database, or a hash table. In other embodiments, the plurality of objects are arranged in a non-hierarchical structure (e.g. a flat data structure).

Returning to the operation of Block 102, defining the object change transaction(s) optionally comprises assigning an object signature for each object of the object change transaction. In one embodiment, the object signature reflects at least a unique digital fingerprint identification of the contents and/or attributes of a version of the edited object. For example, in some embodiments, the transaction assignment module 910 is configured to assign an object signature to each object based on an algorithmic transformation, such as by application of a hash algorithm, to at least one of a content field, a position field, a color field, a size field, a formatting field, a user field, or a change timestamp of an edited object. A myriad of other algorithmic transformations are contemplated by this disclosure to create such unique signature for each edited object and the disclosure is not limited to application of a hash algorithm.

In some embodiments, object signatures (e.g., previous and/or current) are optionally stored in metadata or other contextual data associated with the object. For example, in one embodiment, the object signatures may be stored in association with parent object identifiers and/or child object identifiers that may establish object interdependencies. In some embodiments, the object change transaction comprises the previous object signature and the current object signature (e.g., as a result of the object changes) for each changed object associated with the object change transaction.

In some embodiments, a user can interact with a software application executed by one or both of the first or second client device(s) 508A-B to explicitly identify the object changes to be defined by the respective client device as an object change transaction in association with Block 102. For example, a user may engage a button or other user interface element to indicate an object change transaction (an indicator action) when editing one or more objects of a selected document. In this example, the indicator action may immediately precede or immediately follow the editing of the one or more object such that the software application is configured to respectively associate the indicator action with the edited one or more objects.

In a non-limiting contextual example depicted in FIGS. 2A and 2B, a first user (User 1) is editing a selected document (Website A) using the first client device 508A and second user (User 2) is editing the same selected document using second client device 508B. Example user interfaces illustrating various stages of editing Website A by the first client device 508A and the second client device 508B are shown at times t0, t1, and t2 are depicted in FIG. 2B. For simplicity, Website A is depicted as including two objects, Object 1 corresponding to "TOP" and Object 2 corresponding to "BOTTOM". However, as mentioned above, documents typically include dozens, hundreds, or even thousands of objects, many of which may be grouped together by predefined and/or inferred interdependencies.

In the depicted example, client device 508A detects user input from User 1 reflecting an intent to edit the position of Object 1 by moving Object 1 to the right as shown in time t1. In the depicted example, the client device 508A displays the result of such detected user input such that the client device 508A automatically renders the result of the detected user input as User 1 performs the user input (e.g., an "optimistic" rendering of a pending or tentative object change). The data and instructions representing the move of Object 1 define an example first object change set. Concurrently, client device 508B detects user input from User 2 reflecting an intent to edit the position of Object 1 and Object 2 by moving both Object 1 and Object 2 down as shown at time t1. In the depicted example, the client device 508B displays the result of such detected user input such that the client device 508B automatically renders the result of the detected user input as User 2 performs the user input (e.g., an "optimistic" rendering of a pending or tentative object change). The data and instructions representing the move of Object 1 and Object 2 down as shown at time t1. The data and instructions representing the move of Object 1 and Object 2 define an example second object change set.

In one embodiment, a transaction assignment module 910 is configured to parse the first object change set to define a first object change transaction (Object Change Transaction 1) and parse the second object change set to define a second object change transaction (Object Change Transaction 2). In the depicted embodiment, the transaction assignment module 910 is configured to assign a new object signature to Object 1 based on its changed contents and/or attributes as part of the object change transaction definition operation. The new object signature corresponds to a candidate changed component, the candidate changed component reflecting the changed object after application of the one or more object changes by the user. Similarly, the transaction assignment module 910 is configured to assign new object signatures to each of Object 1 and Object 2 based on their respective movement and changed contents and/or attributes.

In some embodiments, the new object signature and a prior object signature associated with Object 1 forms part of Object Change Transaction 1, wherein the prior object signature corresponds to a unique content of Object 1 prior to application of the object changes by User 1 (e.g., position of Object 1 in the upper left corner as depicted at t0) and the new object signature corresponds to a unique content of Object 1 after application of the object changes by User 1 (e.g., position of Object 1 adjusted to the right as depicted at t1). Similarly, the new object signatures and prior object signatures associated with Objects 1 and 2 form part of Object Change Transaction 2. In some embodiments, each of Object Change Transactions 1 and 2 are optionally transmitted from the respective client devices 508A-B to the transactional-based concurrent editing server 512 (e.g., transactional-based concurrent editing system 510).

Returning to Block 104 of FIG. 1, method 100 further includes identifying at least one of the at least two object change transactions as an approved object change transaction based on application of a conflict handling protocol. For example, in some embodiments, transactional-based concurrent editing server 512, embodied by server apparatus 800, may include means, such as the processor 804, transaction approval determination module 812, and/or the like, which are collectively configured to apply a conflict handling protocol in order to identify an approved object change transaction.

A myriad of conflict handling protocols are contemplated by this disclosure, each conflict handling protocol defining criteria to identify an approved object change transaction. An exemplary conflict handling protocol includes identifying common changed object(s) and applying a change timestamp comparison operation to the identified common changed object(s), wherein the change timestamp comparison operation identifies which transaction corresponds to the common changed object associated with a first in time object change (e.g., by comparison to a time threshold). Another exemplary conflict handling protocol comprises applying a user comparison operation to the identified common changed object(s), the user comparison operation identifying which transaction corresponds to the common changed object associated with a user having superior editing credentials. In another exemplary embodiment, the transaction approval determination module applies a contextual conflict handling protocol that is based on determining a meaning of a user's actions or input. For example, the transaction approval determination module may comprise one or more trained machine learning models to programmatically determine a context or intention associated with object changes by a user such that the one or more trained machine learning models identify an object change transaction associated with higher "importance" as an approved object change transaction, as compared to an object change transaction associated with lesser "importance" that includes a conflicting change.

In some embodiments, the transactional-based concurrent editing server 512 (e.g., transaction approval determination module 812) applies an example conflict handling protocol based on an order of object change transactions. For example, in certain embodiments, the transaction approval determination module 812 comprises an order enforcer module (e.g., Apache Kafka, Apache Zookeeper, Raft, and/or the like) that is optionally configured to generate an ordered object change transaction stream in a data store based on programmatically determining an order of the transactions (e.g., based on a consensus algorithm) from one or more incoming object change transaction streams received from client devices 508A-B or the like. Said differently, the order enforcer module may be configured to build a data pipeline of object change transactions from a variety of data streams originating from, for example, client devices 508A-B, in real-time or near real-time.

In some embodiments, the order enforcer module initiates an ordered object change transaction stream in a data store based on baselined data of the selected document. Continuing with reference to the non-limiting contextual example illustrated by FIG. 2B, the baselined data of Web site A at time t0 is represented by the following Table 1:

TABLE 1

| Baseline | a | d | h | s | w | b | e | m |
|---|---|---|---|---|---|---|---|---|

Table 1

For simplicity, the baseline signature for the depicted "L LOGO" is symbolized by the data structure "a". That is, the unique data and instructions necessary to represent the depicted "L LOGO" (e.g., the position, size, font type, font color, content, etc.) is symbolized by the data structure "a". The baseline signature for the depicted "TOP" (Object 1) in the upper left corner of the user interface is symbolized by the data structure "h". That is, the unique data and instructions necessary to represent the depicted "TOP" (Object 1) in the depicted position is symbolized by the data structure "h". Similarly, the baseline signature for the depicted "BOTTOM" (Object 2) in the left justified position in approximately the middle of the user interface is symbolized by the data structure "b". That is, the unique data and instructions necessary to represent the depicted "TOP" (Object 1) in the depicted position is symbolized by the data structure "b". The other references in Table 1 (e.g., d, s, w, e, m) represent other baselined data (not depicted) for the selected document.

The order enforcer module continues to generate the ordered object change transaction stream in the data store by stacking incoming object change transactions in the determined order. For example, the Object Change Transaction 1 by User 1 corresponding to time t1 is represented by Object Change Transaction 1 in following Table 2:

TABLE 2

| Object Change Transaction 1 | | | h, h1 | | | | | |
|---|---|---|---|---|---|---|---|---|
| Baseline | a | d | h | s | w | b | e | m |

For simplicity, the prior signature for Object 1 (e.g., corresponding to the data and instructions necessary to represent the position of the depicted "TOP" (Object 1) in the top left corner of the user interface) of Object Change Transaction 1 is symbolized by the data structure "h" and the new signature for Object 1 (e.g., corresponding to the data and instructions necessary to represent the position of the depicted "TOP" (Object 1) in the middle of the user interface) of Object Change Transaction 1 is symbolized by the data structure "h1".

The order enforcer module continues to generate the ordered object change transaction stream in the data store by stacking incoming object change transactions in the determined order. For example, the Object Change Transaction 2 by User 2 corresponding to time t1 is represented by Object Change Transaction 2 in following Table 3:

TABLE 3

| Object Change Transaction 2 | | | h, h2 | | | b, b2 | | |
|---|---|---|---|---|---|---|---|---|
| Object Change Transaction 1 | | | h, h1 | | | | | |
| Baseline | a | d | h | s | w | b | e | m |

For simplicity, the prior signature for Object 1 (e.g., the data and instructions necessary to represent the position of the depicted "TOP" (Object 1) in the top left corner of the user interface) of Object Change Transaction 1 is symbolized by the data structure "h" and the new signature for Object 1 (e.g., the data and instructions necessary to represent the position of the depicted "TOP" (Object 1) as moved down respective to its baselined position in the user interface) of Object Change Transaction 2 is symbolized by the data structure "h2". Similarly, the prior signature for Object 2 (e.g., the data and instructions necessary to represent the position of the depicted "BOTTOM" (Object 2) in the left justified position in approximately the middle of the user interface) of Object Change Transaction 2 is symbolized by the data structure "b" and the new signature for Object 2 (e.g., the data and instructions necessary to represent the position of the depicted "BOTTOM" (Object 2) as moved down respective to its baselined position in the user interface) of Object Change Transaction 2 is symbolized by the data structure "b2".

Based on the order of the object change transactions determined by the object order module in the data store, the conflict handling protocol applied in the non-limiting contextual example illustrated by FIG. 2B results in Object Change Transaction 1 being identified as an approved object change transaction. Said differently, the transaction approval determination module may be configured to compare the prior signature for Object 1 in reference to Object Change Transaction 1 (i.e., h) to the baselined signature for Object 1 (i.e., h). In this instance, the compared signatures are consistent such that application of the conflict handling protocol results in the transaction approval determination module identifying Object Change Transaction 1 as an approved object change transaction (e.g., associate Object Change Transaction 1 with an approved object change transaction status). In the depicted embodiment, the transaction approval determination module identifies and/or assigns Object Change Transaction 1 as an approved object change transaction.

It will be appreciated that, in some embodiments, a transactional-based concurrent editing server 512 (e.g., an object change update coordinator module 814) re-baselines the baselined data in the data store to create an updated or new baselined data for Website A in the data store. Such re-baselining is performed periodically as editing progresses, such as to one or more approved object change transactions into the baselined data to create an updated or new baselined data. Continuing with reference to the non-limiting contextual example illustrated by FIG. 2B, the ordered object change transaction stream in the data store including Object Change Transaction 2 and the re-baselined data of Website A at time t1 as a result of applying the approved Object Change Transaction 1 is represented by the following Table 4:

TABLE 4

| Object Change Transaction 2 | | h, h2 | | | b, b2 | | |
|---|---|---|---|---|---|---|---|
| Baseline | a | d | h1 | s | w | b | e | m |

Additionally or alternatively, the transaction approval determination module 812 may be configured to optionally assign Object Change Transaction 2 a rejected object change transaction status. Based on the order of the object change transactions determined by the object order module in the data store, the conflict handling protocol applied in the non-limiting contextual example illustrated by FIG. 2B results in Object Change Transaction 2 being identified as a rejected object change transaction. Said differently, the transaction approval determination module 812 may be configured to compare the prior signature for Object 2 in reference to Object Change Transaction 2 (i.e., h) to the baselined signature for Object 1 (i.e., h1). For example, the transaction approval determination module 812 may be configured to identify a conflicting object based on graph theory (e.g., edges and vertices). For example, the transaction approval determination module 812 may be configured to perform a simple tree comparison algorithm to compare a tree corresponding to the document as associated with Object Change Transaction 2 to the a tree corresponding to the document as associated with the baselined data such that a conflicting object (e.g., Object 1) can be identified. Further details regarding tree comparison algorithms are described in commonly-owned U.S. Pat. No. 9,817,804, which was filed Feb. 11, 2015 as U.S. patent application Ser. No. 14/619,145, and is entitled "SYSTEM FOR COMPARISON AND MERGING OF VERSIONS IN EDITED WEB SITES AND INTERACTIVE APPLICATIONS," which patent is incorporated by reference herein in its entirety.

In this instance, the compared signatures are inconsistent such that application of the conflict handling protocol results in the transaction approval determination module 812 identifying Object Change Transaction 2 as a rejected object change transaction (e.g., associating Object Change Transaction 2 with a rejected object change transaction status). In the depicted embodiment, the transaction approval determination module 812 identifies the Object Change Transaction 2 as a rejected object change transaction (e.g., associates Object Change Transaction with a rejected object change transaction status) regardless of the result of any comparison of signatures associated with Object 2. In such an example, the object change transaction is rejected in its entirety.

In various embodiments, the transaction approval determination module may be configured to delete the Object Change Transaction 2 from the corresponding ordered object change transaction stream, such that the data store is represented by Table 5:

TABLE 5

| Baseline | a | d | h1 | s | w | b | e | m |
|---|---|---|---|---|---|---|---|---|

The above described approach may also be performed by a single client conducting object changes over multiple browser instances. Once the baselining is confirmed and the transactional-based concurrent editing server 512 has identified an approved object change transaction and can broadcast such approved object change transaction to clients. Regardless of the baseline each client has, each client is forced to adopt the new baseline incorporating the object change transactions as approved by the transactional-based concurrent editing server 512.

Similarly, it will be appreciated that, in some embodiments, a transactional-based concurrent editing server 512 may need to roll-back or revert an undesirable change in the data store. In various embodiments, a transactional-based concurrent editing server 512 generates a new object change transaction with the inverse content of the object change required to be rolled-back, thereby reverting the baselined data to a state without the undesirable change. Additionally or alternatively, application of the conflict handling protocol comprises merging two or more object change transactions, including creating a modified merged object change transaction. Such modified merged object change transaction may integrate one or more modified object changes from the two or more object change transactions. In still further embodiments, application of the conflict handling protocol comprises one or more of accessing one or more rules from a rules repository (e.g., rules repository 713 as disclosed with respect to FIG. 7), splitting one or more of the at least two object change transactions, updating a different object not associated with the first object change set or the second object change set, or assigning at least one new object signature to one of the objects involved and resubmitting the object change transactions to the transaction approval determination module.

It is further contemplated by the present disclosure that some conflicts may not be identified as data structure conflicts (e.g., visible through data structure modification analysis as described above, for example, with respect to Tables 1-5). Rather, some conflicts may affect the functionality of the document or website, but are not necessarily tied to or associated with a data model structural conflict. Examples of such conflicts include issues of design, layout, functionality, underlying site purpose, business goals or capabilities, use of resources (e.g., shared or limited), access to external services and other issues or areas of site editing.

In some embodiments, at least one of a potential user-interface layout-related conflict, a potential system resource-related conflict, or a potential system-related conflict is detected among the object change transactions. In a non-limiting contextual example, a potential user interface layout-related conflict may be detected when two users edit components in a container such that setting the positions and/or sizes of the components result in the components entirely or substantially overlapping in ways that make them unusable (e.g., two buttons that occupy the same or similar areas). Another example potential user interface layout-related conflict may be detected when two users edit the distinct colors of overlapping objects and set such overlapping objects to identical or highly similar colors such that the object displayed in the front is hard to distinguish from the object displayed in the back.

In yet another example, a potential user interface layout-related conflict may be detected when two users move and/or resize objects connected via an explicit dynamic layout anchor. That is, a first user moves object A and a second user moves object B, however, object A and object B try to move each other due to an explicit dynamic layout anchor. Details regarding anchor relationship protocols are described in commonly-owned U.S. Pat. No. 10,185,703, which was filed on Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety. Such a potential user interface layout-related conflict may also apply in more complex situations involving other association mechanisms between components (such as dynamic layout rules) and issues related to editing of content vs. editing of the containing component. In such instances of a potential user interface layout-related conflict, the conflict handling protocol is a user interface layout-related conflict handling protocol which may incorporate any of the myriad of conflict handling protocols contemplated by this disclosure.

Turning to system resource-related conflicts, a potential system resource-related conflict may be detected among at least two object change transactions associated with a resource-related object or set of resource-related objects. Two or more objects (and their properties, code, and/or functionality associated with them) may be modified in ways that contradict in regards to the use of external, global, or otherwise limited resources. For example, a first object change transaction may comprise a first object (e.g., a first sound recording-related object) changed by a first user and a second object change transaction may comprise a second object (e.g., a second sound recording-related object) changed by a second user, such that both sound-recording-related objects may be connected to a single system microphone or set of system microphones in a conflicting manner when operating. In such instances of a potential system resource-related conflict, the conflict handling protocol is a system resource-related conflict handling protocol which may incorporate any of the myriad of conflict handling protocols contemplated by this disclosure.

Turning to system-related conflicts, a potential system-related conflict may be detected among at least two object change transactions associated with a system-related object or set of system-related objects. For example, an AI/ML component (e.g., ML/AI repository 715 as depicted in FIG. 7) may generate a decision with a layout-related impact on multiple entities or a system upgrade may result in a layout-related impact on multiple entities. In such instances of a potential system-related conflict, the conflict handling protocol is a system-related conflict handling protocol which may incorporate any of the myriad of conflict handling protocols contemplated by this disclosure.

As described herein with respect to Block 102, the one or more objects of the data model may comprise components, containers, or a combination thereof, which are configured within a document hierarchical data structure. In some embodiments, the document hierarchical data structure of the data model is configured such that each parent object contains a reference to its child(ren) object references. In an example wherein container C is a parent object, new component A (e.g., a button component A) is a child object to container C and new component B (e.g., a text field component B) is another child object to container C. In a typical data model wherein a parent object (i.e., container C) points to or otherwise contains a reference to its child(ren) object(s), which may be properties of container C, such addition of components A and B at the same time subsequently may be identified as a potential conflict by the transaction approval determination module as components A and B touch the same object (i.e., container C). In an alternative embodiment, the data model is an alternate data model such that the document hierarchical data structure of the data model is configured such that each child object instead contains a reference to its parent object. With continuing reference to the example above, container C is a parent object, new component A (e.g., a button component A) is a child object to container C, and new component B (e.g., a text field component B) is another child object to container C. In such embodiments, application of the conflict handling protocol does not identify a potential conflict with respect to the parent object and the transaction approval determination module would identify both object change transactions (i.e., the addition of button component A and text filed component B) as approved object change transactions.

Returning to Block 106 of FIG. 1, method 100 further includes updating the data model of the selected document with the at least one approved object change transaction. For example, in some embodiments, transactional-based concurrent editing server 512, embodied by server apparatus 800, may include means, such as the processor 804, object change update coordinator module 814, and/or the like, which are collectively configured to apply, to the data model of the selected document, the approved object change transaction identified by application of the conflict handling protocol in Block 104 (e.g., the re-baselined data of the data store).

Thus, with reference to the non-limiting contextual example discussed in connection with FIG. 2B, the object change update coordinator module 814 may be configured to update Object Change Transaction 1 to the data model of Website A such that Object 1 is moved (eventually as discussed below) to the right as intended by User 1 operating client device 508A.

Returning to Block 108 of FIG. 1, method 100 optionally further includes causing rendering of a first updated document interface based on the updated data model. For example, in some embodiments, transactional-based concurrent editing server 512, embodied by server apparatus 800, may include means, such as memory 802, processor 804, input/output module 806, communications module 808, object change update coordinator module 814, and/or the like, which are collectively configured to broadcast the approved object change transaction in order to cause rendering of the first updated document interface to one or more client devices 508A-B, wherein the first updated document interface indicates execution of the accepted object change transaction in response to the updated data model. Said differently, the first updated document interface may indicate replacement of a candidate changed component corresponding to implementation of the second object change transaction with an approved changed component, wherein the approved changed component embodies an approved change corresponding to implementation of the first object change transaction.

Thus, in reference to the user interfaces depicted in FIG. 2B, an output module (e.g., input/output module 806, communications module 808, and/or object change update coordinator module 814) is configured to broadcast the approved Object Change Transaction 1 (e.g., associated with an approved object change transaction state) in order to cause rendering of an updated Website A in a first updated document interface at client device 508B. Notably, the updated Web site A reflects Object 1 moved to the right based on the updated data model as shown at time t2, which stands in contrast to the changes inputted by User 2 (e.g., moving Object 1 and Object 2 down), which were temporarily displayed changes (e.g., optimistic rendering) at t1. In such example, the first updated document interface indicates replacement of a candidate changed component corresponding to implementation of the second object change transaction (e.g., the optimistic rendering of the changes inputted by User 2) with an approved changed component, wherein the approved changed component embodies the approved change corresponding to implementation of the first object change transaction (Object Change Transaction 1).

Additionally or alternatively, in some embodiments, transactional-based concurrent editing server 512 may cause rendering of a user notification interface component (not shown) at client device 508B, wherein the user notification interface component indicates that the second object change transaction (e.g., Object Change Transaction 2) was not updated to the data model due to a conflict with a concurrent change made by another user. In some embodiments, the transactional-based concurrent editing server 512 causes rendering of the user notification interface component to client device 508B by broadcasting the approved Object Change Transaction 1 (e.g., associated with an approved object change transaction state) to the client devices 508A-B causing the client device 508B to render replacement of the candidate changed component corresponding to implementation of the second object change transaction (e.g., the optimistic rendering of the changes inputted by User 2) with the approved changed component, wherein the user notification interface component indicates that the Object Change Transaction 2 has not been updated to the data model. Additionally or alternatively still, in some embodiments, transactional-based concurrent editing server 512 may be configured to cause rendering of a communication interface component (not shown) to each of client devices 508A-B, the communication interface component configured to enable one or more communications, dialogs, modals, pop-up windows, chat messages, or the like between the client devices 508A-B for discussing the conflicting object changes. For example, continuing in the non-limiting contextual example discussed above, the transactional-based concurrent editing server 512 may be configured to automatically cause rendering of a chat interface enabling direct communications between User 1 and User 2 to discuss the changes proposed to Object 1. Additionally or alternatively, in some embodiments, transactional-based concurrent editing server 512 and/or client device 508B may optionally store the rejected Object Change Transaction 2 so that User 2 may reapply the transaction later, if needed.

FIG. 1B is a signal diagram of an example data flow represented by method 100. That is, FIG. 1B illustrates an example signal diagram illustrating data flow interactions between example components of the system 500 of FIG. 5, including a transactional-based concurrent editing server, a repository, and two client devices, when implementing network transactional-based concurrent editing of a document by two or more users in accordance with one embodiment. Method 100 is described as being performed by a first client device 508A, a second client device 508B, a transactional-based concurrent editing server 512, and a document repository 514. These system components may be similar to those discussed with regards to transactional-based concurrent editing system 510 depicted in FIG. 5.

In the depicted embodiment, client device 508A (i.e., the transaction assignment module 910 of client device 508A) defines an object change transaction (Object Change Transaction 1) and pushes the defined object change transaction to a transactional-based concurrent editing server 512 at operation 102. Continuing with the non-limiting contextual example set forth in 2B, such object change transaction was defined, for example, based on the object changes corresponding to User 1 editing the position of Object 1 by moving Object 1 to the right as shown in time t1. Similarly, client device 508B (i.e., the transaction assignment module 910 of client device 508B) defines an object change transaction (Object Change Transaction 2) and pushes the defined object change transaction to the transactional-based concurrent editing server 512 at operation 102. Such object change transaction was defined, for example, based on the object changes corresponding to User 2 editing the positions of Object 1 and Object 2 by moving both Object 1 and Object 2 down as shown at time t1. In the depicted embodiment, the object change transactions occur at approximately the same time (i.e., t1).

In the depicted embodiment, subsequent to receiving the object change transactions, the transactional-based concurrent editing server 512 (i.e., transaction approval determination module 812) identifies at least one of the at least two object change transactions as an approved object change transaction based on application of a conflict handling protocol at operation 104. Continuing with the non-limiting contextual example set forth in 2B, the transaction approval determination module 812 may comprise an order enforcer module and apply a signature comparison conflict handling protocol to the ordered transactions to identify Object Change Transaction 1 as an approved object change transaction.

At operation 106, the transactional-based concurrent editing server (i.e., the object change update coordinator module 814) may update the data model by pushing one of the object change transactions (e.g., based on the baselined data store) to a repository hosting the data model, for example, document repository 114 as in the depicted embodiment, in order to apply the object change transaction. The object change transaction that is pushed to the document repository 114 is selected based on application of the conflict handling protocol, such as performed at operation 104. Continuing with the non-limiting contextual example set forth in 2B, Object Change Transaction 1 may be pushed to the document repository.

At operation 108, the transactional-based concurrent editing server (i.e., the object change update coordinator module 814) may broadcast the approved object change transaction to the client devices 508A-B to cause rendering of a first updated document interface. In the depicted embodiment, the transactional-based concurrent editing server pushes data and instructions for rendering the first updated document interface to at least client device 508B, the first updated document interface based on the updated data model from document repository 114. Continuing with the non-limiting contextual example set forth in 2B, the object change update coordinator module 814 may push data and instructions to client device 508B for rendering Object 1 moved to the right based on the updated data model as shown at time t2. In some embodiments, broadcasting or pushing the approved object change transaction to client device 508A results in no change to the user interface as the object changes corresponding to the approved object change transaction were already optimistically rendered to the user interface of client device 508A at the time the object changes were input. Continuing with the non-limiting contextual example set forth in 2B, the object change update coordinator module 814 may push data and instructions to client device 508A for rendering Object 1 moved to the right based on the updated data model, however, such object changes are already reflected as shown at time t1 compared to t2

Turning now to FIG. 3, example operations are shown for defining an object change transaction. The operations illustrated in FIG. 3 may, for example, be performed by one or more client devices 508A-N, which may include means, such as memory 902, processor 904, input/output module 906, communications module 908, transaction assignment module 910, and/or the like, which are collectively configured for defining at least one object change transaction.

As illustrated at Block 302, in some embodiments, method 300 includes receiving at least one object change set originating from at least one change interface session. For example, an example client device 508A may include means, such as the processor 904, input/output module 906, transaction assignment module 910, and/or the like, which are collectively configured for receiving at least one object change set. A change interface session is initialized to cull, track, amass, and/or aggregate edits or changes from a user with respect to a selected document. In some embodiments, the at least one change interface session comprises a first change interface session associated with a first web browser tab associated with a first user device and a second change interface session associated with a second web browser tab associated with the first user device, such that the object change sets originate from the same first client device 508A. In other embodiments, at least one change interface session comprises a first change interface session associated with a first user device 508A and a second change interface session associated with a second user device 508A, such that the object change sets originate from different client devices 508A-B.

In some embodiments, client device 508A accesses a selected document (e.g., from shared document repository 514) and detects user input indicating a change or edit to an attribute(s) of an object(s) of the selected document during a change interface session. For example, in some embodiments, an object change comprises at least one of a component size change, a component position change, a component content change, a component content formatting change, a container size change, a container position change, a container content change, or a container content formatting change, or a re-parenting of a component (e.g., moving a component from one container to another).

An object may be content-less or comprise internal content. For example, an object corresponding to a star-shaped component may not have any internal content (though it has color, size, position and some other parameters and attributes). In another example, an object corresponding to a text paragraph component may have internal content including internal text, as well as font, formatting, and layout information. Such content may vary from one instance of the text paragraph component to another.

In some embodiments, an example object change set can include a single object change to a single object (e.g., a change color of a selected object). In further embodiments, an example object change set can include a plurality of object changes to a single object (e.g., change of color and position of a selected object).

In still further embodiments, an example object change set can include a plurality of object changes to a plurality of objects (e.g., a change of color and position of a first selected object, and a change of color of a second selected object).

As illustrated at Block 304, in some embodiments, method 300 includes parsing the at least one object change set to identify one or more objects, one or more object changes, and one or more object groups in the at least one object change set. For example, an example first client device 508A may include means, such as the processor 904, transaction assignment module 910, and/or the like, which are collectively configured to parse or break down each object change set to identify individual object(s) and/or object group(s) and their associated object change(s).

In some embodiments, identifying one or more object groups includes applying one or more grouping protocols to the identified objects to identify object group(s). For example, the example client device 508A may include means, such as memory 902, processor 904, transaction assignment module 910, and/or the like, which are collectively configured to apply one or more grouping protocols to the identified objects in order to identify any explicitly and/or implicitly related objects to each changed object identified in the object change set. In some embodiments, the client device 508A-B accesses memory 902 and/or a repository to access such object grouping protocols.

A myriad of object grouping protocols are contemplated by this disclosure, each object grouping protocol defining grouping criteria for identifying an explicit and/or implicit relationship between changed objects. Exemplary object grouping protocols include a contextual relationship protocol, a hierarchical data structure protocol, an anchor relationship protocol, a geometrical relationship protocol, a semantic relationship protocol, and/or the like. Further details regarding object grouping protocols are described in commonly-owned U.S. Pat. No. 10,176,154, which was filed Sep. 11, 2014 as U.S. patent application Ser. No. 14/483, 981, and is entitled "SYSTEM AND METHOD FOR AUTOMATED CONVERSION OF INTERACTIVE SITES AND APPLICATIONS TO SUPPORT MOBILE AND OTHER DISPLAY ENVIRONMENTS," which patent is incorporated by reference herein in its entirety.

For example, objects may be grouped based on a contextual relationship protocol, wherein a client device 508A-B can identify multiple objects in an object change set to a single group because they have been changed by one context, such as a user operation. For example, returning to the illustrated interface of FIG. 2B, User 2 may move both Object 1 and Object 2 in a single drag and drop operation such that application of a contextual relationship protocol identifies Object 1 as grouped and/or associated with Object 2. That object grouping is maintained throughout conflict resolution as discussed in greater detail herein.

In another example, objects may be grouped based on a hierarchical data structure protocol. For example, the underlying data of the selected document is defined by a structured data model that includes a multi-dimensional hierarchy of the objects. In some embodiments, such hierarchical arrangements include atomic components (text, image, shape, video, etc.) as well as various types of container components which contain other components (e.g., regular containers, single-page containers, multi-page containers, gallery containers, etc.). For example, sub-pages contained inside a container component can further contain multiple components.

Based on such hierarchical data structure protocol, a client device 508A-B can identify predefined related objects in the object change set (e.g., two objects are related as part of the same container). An example hierarchical data structure is a tree-structured data structure.

In another example, an anchor relationship protocol is applied to identify explicit and/or implicit relationship(s) between objects. Such anchor relationship protocols can identify predefined anchor relationships and/or programmatically generated anchor relationship (e.g., identified as potentially related at run-time based on, for example, the spatial relationship between two components). Further details regarding anchor relationship protocols are described in commonly-owned U.S. Pat. No. 10,185,703, which was filed on Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety.

In another example, a geometrical relationship protocol is applied to identify explicit and/or implicit relationship(s) between objects. For example, a geometrical relationship protocol may identify a geometrical relationship between two or more objects based on one or more of overlap, intersection, proximity, relative position, and relative size of the at least two objects. Further details regarding geometric relationship protocols are described in commonly-owned U.S. Pat. No. 9,817,804, which was filed on Feb. 11, 2015 as U.S. patent application Ser. No. 14/619,145, and is entitled "SYSTEM FOR COMPARISON AND MERGING OF VERSIONS IN EDITED WEBSITES AND INTERACTIVE APPLICATIONS," which patent is incorporated by reference herein in its entirety.

In another example, a semantic relationship protocol is applied to identify explicit and/or implicit relationship(s) between objects. For example, a semantic relationship protocol may identify a semantic relationship between two or more objects based on one or more of a picture type and caption type combination, a button type and text type combination, a multiple text type combination, a multiple picture type combination, or any combination thereof. Further details regarding semantic relationship protocols are described in commonly-owned U.S. Pat. No. 10,176,154, which was filed on Sep. 11, 2014 as U.S. patent application Ser. No. 14/483,981, and is entitled "SYSTEM AND METHOD FOR AUTOMATED CONVERSION OF INTERACTIVE SITES AND APPLICATIONS TO SUPPORT MOBILE AND OTHER DISPLAY ENVIRONMENTS," which patent is incorporated by reference herein in its entirety.

As illustrated at Block 306, in some embodiments, method 300 includes applying a transaction assignment protocol to the one or more object groups (e.g., or individually identified objects) to define at least one object change transaction. For example, an example client device 508A may include means, such as memory 902, processor 904, transaction assignment module 910, and/or the like, which are collectively configured to apply a transaction assignment protocol to the identified object groups and/or objects. For example, in some embodiments, the client device 508A-B accesses memory 902 and/or a repository to access such transaction assignment protocol. In some embodiments, the transaction assignment protocol includes assigning each object included in the defined object transaction an object signature to reflect a new unique content of the object (e.g., to enable later comparison of objects to identify changes and/or conflicts).

In an exemplary embodiment, it is contemplated by this disclosure that, in some embodiments, application of the one or more object grouping protocols does not identify an applicable relationship between a selected object and another object of the document such that the transaction assignment protocol includes only the selected object as associated with one or more object changes as an object change transaction. In other exemplary embodiments, the transaction assignment protocol includes defining two or more objects associated with two or more object changes as an object change transaction. In a further example, it is contemplated by this disclosure that, in some embodiments, application of the one or more object grouping protocols identifies an object group comprising a plurality of objects, wherein only one object is subject to an object change and yet the transaction assignment protocol includes defining the plurality of objects, including the single object and object change, as an object change transaction.

As illustrated at Block 308, in some embodiments, method 300 includes outputting the at least one object change transaction to a transaction approval determination module. For example, the client device 508A-B may include means, such as processor 904, input/output module 906, communications module 908, transaction assignment module 910, and/or the like, which are collectively configured to output the at least one object change transaction to a transaction approval determination module, such as via the communications network 502 to a transactional-based concurrent editing server 512 comprising transaction approval determination module 812 as described herein.

Turning now to FIG. 4, example operations are shown for implementing network transactional-based concurrent editing of a document. The operations illustrated in FIG. 4 may, for example, be performed by, with the assistance of, and/or under the control of a client apparatus 900 (e.g., client device 508B). In this regard, performance of the operations may invoke one or more of memory 902, processor 904, input/output module 906, communications module 908, and/or transaction assignment module 910.

In the embodiment illustrated in FIG. 4, the flowchart illustrates method 400 which includes causing rendering of a selected document to a document editing interface at Block 402. For example, in some embodiments, an example client device 508B, embodied by client apparatus 900, may include means, such as memory 902, processor 904, input/output module 906, communications module 908, and/or the like, which are collectively configured to cause rendering of a selected document to a document editing interface. In some embodiments, the client device 508B generates and transmits a document request to an external computing system, for example, transactional-based concurrent editing server 512 and/or document repository 514 (e.g., a shared document repository), to obtain access to a selected document for editing. The client device 508B causes rendering of the selected document to a document editing interface to, for example, the display of the client device 508B.

Returning to Block 404 of FIG. 4, method 400 includes detecting a candidate change to a component of the selected document. For example, in some embodiments, client device 508B, embodied by client apparatus 900, may include means, such as the processor 904, input/output module 906, and/or the like, which are collectively configured to detect a candidate change to a component of the selected document.

In some embodiments, a client device 508B detects user input indicating one or more candidate changes to a component of the selected document. For example, in some embodiments, the input/output module 906 is configured to detect any one of a multitude of interactions with the selected document, such as, but not limited to, keystroke engagement, touch-screen engagement, or mouse click engagement, and the like.

Returning to Block 406 of FIG. 4, method 400 includes updating the document editing interface to replace the component with a candidate changed component. For example, in some embodiments, a client device 508B, embodied by client apparatus 900, may include means, such as the processor 904, input/output module 906, and/or the like, which are collectively configured to update the document editing interface to replace the component with a candidate changed component, wherein the candidate changed component reflects application of the candidate change to the component. Such optimistic rendering of updates provides immediate feedback to the user associated with the client device 508B corresponding to the user input provided by the user. For example, in reference to the user interfaces depicted in FIG. 2B with respect to example client device 508B, the component of Object 1 and Object 2 both being located in the original left and top positions is replaced with the candidate changed component of Object 1 and Object 2 both being moved down at time t1 in comparison to time t0. Additionally or alternatively, in some embodiments, the rendering of the candidate changed component is associated with a visual emphasis element that indicates a state of the component. For example, the visual emphasis element may provide an indication to the user that the candidate changed component is a tentative or pending change until it is approved (e.g., via a transactional-based concurrent editing server). The visual emphasis element may include emphasizing, for example, an image, icon, or text of the candidate changed component displayed to the client device 508A-B (e.g., coloring scheme, highlighted, bolded, italicized, enlarged, shaded, flashing, pulsing, or changing in size, etc.).

Returning to Block 408 of FIG. 4, method 400 includes updating the document editing interface to replace the candidate changed component with an approved changed component. For example, in some embodiments, a client device 508, embodied by client apparatus 900, may include means, such as the processor 904, input/output module 906, communications module 908, and/or the like, which are collectively configured to update the document editing interface to replace the candidate changed component with an approved changed component triggered following application of a conflict handling protocol. In some embodiments, the approved changed component embodies an approved change to the component of the selected document that differs from the candidate change. Thus, in reference to the user interfaces depicted in FIG. 2B with respect to example client device 508B, the candidate changed component of Object 1 and Object 2 being moved down as shown at time t1 is replaced with the approved changed component of Object 1 being moved to the right and Object 2 in its original position as shown at time t2, which stands in contrast to the changes inputted by User 2 (e.g., moving Object 1 and Object 2 down), which were temporarily displayed changes at t1. Additionally or alternatively, in some embodiments, the replacement of the candidate changed component with the approved changed component includes rendering the approved changed component in association with a visual emphasis element that indicates a state of the approved changed component. For example, the visual emphasis element may be a change emphasis element providing an indication to the user that the candidate changed component was rejected and the approved changed component is different than the intentions of the user. The visual emphasis element may include emphasizing, for example, an image, icon, or text of the approved changed component and/or the differences between the candidate changed component and the approved changed component displayed to the client device 508B (e.g., coloring scheme, highlighted, bolded, italicized, enlarged, shaded, flashing, pulsing, or changing in size, etc.).

FIGS. 1A, 1B, 3, and 4 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, module, circuitry, and/or other devices associated with execution of software including one or more computer program instructions. For example, one or more of the operations described above may be implemented by an apparatus executing computer program instructions. In this regard, the computer program instructions may be stored by a memory 802 of the transactional-based concurrent editing server 512 and executed by a processor 804 of the transactional-based concurrent editing server 512.

As will be appreciated, any disclosed computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Example Computing Systems and Apparatuses of the Disclosure

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 5 illustrates a block diagram of an example system that may be specially configured within which embodiments of the present disclosure may operate. In this regard, FIG. 5 illustrates an overview for a computing system 500 which may include one or more devices and sub-systems that are configured for performing some or all of the various operations and processes described herein. In some examples, such a system 500 implements network transactional-based concurrent editing of document(s) via a transactional-based concurrent editing system 510 in accordance with some embodiments described herein. Said differently, the various depicted devices of the computing system 500 communicate to, in some embodiments, implement network transactional-based concurrent editing of a document.

The computing system 500 is illustrated with a transactional-based concurrent editing system 510 communicably connected via a network 502 to one or more client devices 508A-508B (referred to as "client devices 508"; the depictions in FIG. 5 of "B" client devices are merely for illustration purposes). Said differently, users may access the transactional-based concurrent editing system 510 over at least one communications network 502 using one or more of client devices 508. In some embodiments, each of the client devices 508A-B is embodied by one or more user-facing computing devices embodied in hardware, software, firmware, and/or a combination thereof, configured for performing some or all of the transactional-based concurrent editing functionality described herein. That is, the client devices 508A-B may include circuitry, modules, networked processors, a suitable network server, and/or other type of processing device (e.g., a controller or computing device of the client device 508). For example, in some embodiments, a client device 508A-B is embodied by a personal computer, a desktop computer, a laptop computer, a computing terminal, a smartphone, a netbook, a tablet computer, a personal digital assistant, a wearable device, a smart home device, and/or other networked device that may be used for any suitable purpose in addition to performing some or all of the transactional-based concurrent editing functionality described herein. In some example contexts, the client device 508A-B is configured to execute one or more computing programs to perform the various functionality described herein. For example, the client device 508A-B may execute a web-based application or applet (e.g., accessible via a website), a software application installed to the client device 508A-B (e.g., an "app"), or other computer-coded instructions accessible to the client device 508.

In some embodiments, the client devices 508A-B may include various hardware, software, firmware, and/or the like for interfacing with the transactional-based concurrent editing system 510. Said differently, a client device 508A-B may be configured to access the transactional-based concurrent editing system 510 and/or to render information provided by the transactional-based concurrent editing system 510 (e.g., via a software application executed on the client device 508). According to some embodiments, the client device 508A-B comprises a display for rendering various interfaces, including one or more document editing interface(s) representing the selected document. For example, in some embodiments, the client device 508A-B is configured to display such interface(s) on the display of the client device 508A-B for viewing, editing, and/or otherwise interacting with at least a selected document, which may be provided by the transactional-based concurrent editing system 510. Additionally or alternatively still, in some embodiments, the client device 508A-B is configured to update a document editing interface to replace one or more candidate changed component(s) with an approved changed component generated by another user, wherein the approved changed component reflects application of an approved change to the component (e.g., based on a determination with respect to conflicting object change transactions).

Additionally or alternatively, in some embodiments, the client device 508A-B is configured for performing one or more processes associated with defining object change transaction(s). For example, according to some embodiments, the client device 508A-B is configured to programmatically define object change transaction(s) based on one or more objects and/or object changes (e.g., via a software application executed on the client device 508).

In some embodiments, the transactional-based concurrent editing system 510 includes one or more servers, such as transactional-based concurrent editing server 512. For example, transactional-based concurrent editing system 510 may implement some of its functionality on a server or a server set (e.g., transactional-based concurrent editing server 512), and some of its functionality on client elements (e.g., client devices 508A-B). In some embodiments, the transactional-based concurrent editing system 510 dynamically determines whether to perform some functionality on the server or the client platform. In some embodiments, the transactional-based concurrent editing system 510 comprises other servers and components, as described below with respect to the exemplary depicted embodiment of a website building system 610 in FIG. 6.

Transactional-based concurrent editing server 512 may be any suitable network server and/or other type of processing device. In this regard, the transactional-based concurrent editing server 512 may be embodied by any of a variety of devices, for example, the transactional-based concurrent editing server 512 may be embodied as a computer or a plurality of computers. For example, transactional-based concurrent editing server 512 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least a portion of the components illustrated with respect to server apparatus 800 in FIG. 8 and described in connection therewith. The transactional-based concurrent editing server 512 may, in some embodiments, comprise several servers or computing devices performing interconnected and/or distributed functions. Despite the many arrangements contemplated herein, transactional-based concurrent editing server 512 is shown and described herein as a single computing device to avoid unnecessarily overcomplicating the disclosure.

In some embodiments, the transactional-based concurrent editing server 512 is configured, via one or more software modules, hardware modules, or a combination thereof, to access communications network 502 for communicating with one or more of the client devices 508. Additionally or alternatively, the transactional-based concurrent editing server 512 is configured, via software, hardware, or a combination thereof, to is configured to execute any of a myriad of processes associated with the implementing transactional-based concurrent editing. Said differently, transactional-based concurrent editing server 512 may include circuitry, modules, networked processors, or the like, configured to perform some or all of the transactional-based concurrent editing functionality, as described herein. In this regard, for example, in some embodiments, the transactional-based concurrent editing server 512 receives and processes object data and/or object change data. For example, in various embodiments, the transactional-based concurrent editing server 512 is configured to receive object change transaction(s) in the transactional-based concurrent editing system 510. In some embodiments, the object change transaction(s) are initiated by and/or originate from, for example, one or more client devices 508. For example, in certain embodiments, the client device 508A-B is configured to define one or more object change transaction(s) based on an object change set comprising one or more object changes to one or more objects. Additionally or alternatively, in some embodiments, an object change transaction is initiated by and/or originates from an application, a service, or the like. For example, the client devices 508A-B and/or an application may communicate with the transactional-based concurrent editing system 510 (e.g., transactional-based concurrent editing server 512) via one or more application programming interfaces (APIs), web interfaces, web services, or the like.

In some embodiments, the transactional-based concurrent editing server 512 is configured to define one or more object change transaction(s) based on an object change set(s). In some embodiments, for example, the transactional-based concurrent editing server 512 is configured to receive one or more object change set(s) from another device in the transactional-based concurrent editing system 510 and to parse the object change set(s) to define such object change transaction(s). In some embodiments, the object change set(s) are initiated by and/or originate from, for example, one or more client devices 508. For example, in certain embodiments, the client device 508A-B is configured to transmit one or more object change set(s) based on detection and/or receipt of one or more object changes to one or more objects. Additionally or alternatively, in some embodiments, an object change set is initiated by and/or originates from an application, a service, or the like. In some embodiments, the transactional-based concurrent editing server 512 retrieves data from and/or transmits data to, for example, document repository 514, to define such object change transaction(s). In still further embodiments, the transactional-based concurrent editing server 512 identifies an approved object change transaction based on application of a conflict handling protocol.

In some embodiments, the transactional-based concurrent editing system 510 includes at least one repository, such as document repository 514. Such repository(ies) may be hosted by the transactional-based concurrent editing server 512 or otherwise hosted by devices in communication with the transactional-based concurrent editing server 512. As depicted, in some embodiments, the transactional-based concurrent editing server 512 is communicable with the document repository 514. In some embodiments, the transactional-based concurrent editing server 512 may be located remotely from the document repository 514. In this regard, in some embodiments, the transactional-based concurrent editing server 512 is directly coupled to the document repository 514 within the transactional-based concurrent editing system 510.

Alternatively or additionally, in some embodiments, the transactional-based concurrent editing server 512 is wirelessly coupled to the document repository 514. In yet other embodiments, the document repository 514 and/or the protocol repository 516 is embodied as a sub-system(s) of the transactional-based concurrent editing server 512. That is, the transactional-based concurrent editing server 512 may comprise the document repository 514. Alternatively or additionally, in some embodiments, the document repository 514 is embodied as a virtual repository executing on the transactional-based concurrent editing server 512.

The document repository 514 may be embodied by hardware, software, or a combination thereof, for storing, generating, and/or retrieving data and information utilized by the transactional-based concurrent editing system 510 for performing the operations described herein. For example, document repository 514 may be stored by any suitable storage device configured to store some or all of the information described herein (e.g., memory 802 of the transactional-based concurrent editing server 512 or a separate memory system separate from the transactional-based concurrent editing server 512, such as one or more database systems, backend data servers, network databases, cloud storage devices, or the like provided by another device (e.g., online application or 3rd party provider), such as a Network Attached Storage (NAS) device or devices, or as a separate database server or servers). Document repository 514 may comprise data received from the transactional-based concurrent editing server 512 (e.g., via a memory 802 and/or processor(s) 804) and/or a client device 508, and the corresponding storage device may thus store this data. The document repository 514 may store various data in any of a myriad of manners, formats, tables, computing devices, and/or the like. For example, in some embodiments, the document repository 514 includes one or more sub-repositories that are configured to store specific data processed by the transactional-based concurrent editing system 510. Document repository 514 includes information accessed and stored by the transactional-based concurrent editing server 512 to facilitate the operations of the transactional-based concurrent editing system 510. As such, document repository 514 may include, for example, without limitation, object data, object change data, document identifier(s), object identifier(s), user identifier(s), grouping protocol identifier(s), assignment protocol identifier(s), transaction identifier(s), object signature(s), and/or the like.

Transactional-based concurrent editing system 510 (e.g., transactional-based concurrent editing server 512) can communicate with one or more client devices 508A-B via communications network 502. Communications network 502 may include any one or more wired and/or wireless communication networks including, for example, a wired or wireless local area network (LAN), personal area network (PAN), metropolitan area network (MAN), wide area network (WAN), or the like, or combinations thereof, as well as any hardware, software and/or firmware required for implementing the one or more networks (e.g., network routers, switches, hubs, etc.). For example, communications network 502 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network.

Furthermore, the communications network 502 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the transactional-based concurrent editing system 510, such as JavaScript Object Notation (JSON) objects sent via a WebSocket channel. In some embodiments, the protocol is JSON over RPC, JSON over REST/HTTP, the like, or combinations thereof.

In some embodiments, the transactional-based concurrent editing system 510 is a standalone system. In other embodiments, the transactional-based concurrent editing system 510 is embedded inside of a larger editing system. For example, in certain embodiments, the transactional-based concurrent editing system 510 is associated with a visual design system and further still, in some embodiments, the visual design system is one or more of a document building system, a website building system, or an application building system.

An example of a transactional-based concurrent editing system (e.g., a transactional-based concurrent editing system 510 as depicted in FIG. 5) is depicted in FIG. 6. In particular, FIG. 6 depicts a computing system 600 including a website building system ("WBS") 610 as an example transactional-based concurrent editing system for the creation and/or update of, for example, hierarchical websites. In some embodiments, multiple users may be concurrently or simultaneously editing the same webpage such that implementing network transactional-based concurrent editing as described herein is beneficial.

A WBS 610 may be online (i.e., applications are edited and stored on a server or server set), off-line, or partially online (with web sites being edited locally but uploaded to a central server for publishing). A WBS 610 may be accessed by a variety of users via a network 602, including designers, subscribers, subscribing users or site editors, and code editors, which are the users designing the web sites, as well as end users which are the "users of users" accessing the created web sites. Although end users may typically access the WBS 610 in a read-only mode, a WBS (and web sites) may allow end users to perform changes to a web site, such as adding or editing data records, adding talkbacks to news articles, adding blog entries to blogs, and/or the like.

In some embodiments, a WBS 610 may allow multiple levels of users and different permissions and capabilities may be associated with and/or assigned to each level. For example, users may register with the WBS 610 (e.g., via the WBS server which manages the users, web sites, and access parameters of the end users).

With reference to FIG. 6, in addition to a transactional-based concurrent editing service 612, and a document repository 614, a WBS 610 may comprise a WBS site manager 605, an object marketplace 615, a RT (runtime) server 620, a WBS editor 630, a site generation system 640 and a WBS content management system 700. WBS 610 is depicted in communication with embodiments of the client devices 508A-B which are depicted as being operated by WBS vendor staff 608A, WBS site designer 608B (i.e., a user), a site viewer 608N (i.e., a user of a user), as well as external systems 670. For example, WBS vendor staff 608A may be an employee of the pertinent website building system vendor and may create and maintain various WBS elements such as templates, content/layout elements, and/or the like. In some embodiments, a site designer 608B may use WBS 610 to build his site for use by site viewers 608N.

Additionally or alternatively, a site designer 608B may be an external site designer or consultant, though the website building system vendor may employ site designers 608B, for example for the creation of template sites for inclusion in the WBS 610. In some embodiments, site viewers 608N may only view the system. Additionally or alternatively, in some embodiments, site viewers 608N may be allowed some form of site input or editing (e.g., talkback sending or blog article posting). In still further embodiments, WBS 610 comprises a limited site generation system 640 configured to allow a viewer 608N to build (e.g., a user page) within a social networking site. It is contemplated by this disclosure that a site viewer 608N may also include a site designer 608B.

In some embodiments, WBS site manager 605 is used by site designer 608B to manage his created sites (e.g., to handle payment for the site hosting or set permissions for site access). In some embodiments, WBS RT (runtime) server 620 handles run-time access by one or more (e.g., possibly numerous) site viewers 63. In some embodiments, such access is read-only, but in certain embodiments, such access involve interactions which may affect back-end data or front-end display (e.g., purchasing a product or posting a comment in a blog). In some embodiments, WBS RT server 620 serves pages to site designers 608B (e.g., when previewing the site, or as a front-end to WBS editor 630).

In some embodiments, object marketplace 615 allows trading of objects (e.g., as add-on application, templates, and element types) between object vendors and site designers 608B through WBS 610. In some embodiments, WBS editor 630 allows site designer 608B to edit site pages (e.g., manually or automatically generated), such as editing of content, logic, layout, attributes, and/or the like. For example, in some embodiments, WBS editor 630 allows site designer 608B to adapt a particular template and its elements according to his business or industry.

In some embodiments, site generation system 640 creates the actual site based on the integration and analysis of information entered by site designer 608B (e.g., via questionnaires), pre-specified and stored in content management system 700 together with information from external systems 670 and internal information held within CMS 700 that may be gleaned from use of the WBS 610 by other designers. Additionally or alternatively, CMS 700 is held in centralized storage or locally by site designer 608B. Example repositories of a CMS 700 are described below with respect to FIG. 7.

With reference to FIG. 7, an example CMS 700 is illustrated. The WBS 610 may utilize a CMS 700, comprising a series of repositories, stored over one or more servers or server farms, to support creation of various web sites. For example, CMS 700 may include one or more of user information/profile repository 712, WBS component repository 716, WBS site repository 709, business intelligence (BI) repository 710, and editing history repository 711. Additionally or alternatively, CMS 700 may include one or more of questionnaire type repository 701, content element type repository 702, LE (layout element) type repository 703, design kit repository 704, filled questionnaires repository 705, CER (content element repository) 706, LER (layout element repository) 707, layout selection store 708, rules repository 713, family/industry repository 714, and ML/AI (machine learning/artificial intelligence) repository 715. A CMS 700 may also include a CMS coordinator 717 to coordinate and control access to such one or more repositories.

It is contemplated by this disclosure that the WBS 610 can be used to create and/or update hierarchical websites based on visual editing or automatic generation based on collected business knowledge, wherein collected business knowledge refers to the collection of relevant content to the web site being created which may be gleaned from, for example, external systems 670 or other sources. Further details regarding collected business knowledge are described in commonly-owned U.S. Pat. No. 10,073,923 which was filed May 29, 2017 as U.S. patent application Ser. No. 15/607,586, and is entitled "SYSTEM AND METHOD FOR THE CREATION AND UPDATE OF HIERARCHICAL WEBSITES BASED ON COLLECTED BUSINESS KNOWLEDGE," which application is incorporated by reference herein in its entirety.

In some embodiments, WBS 610 uses internal data architecture to store WBS-based sites. For example, this architecture may organize the handled sites' internal data and elements inside the WBS 610. This architecture may be different from the external view of the site (as seen, for example, by the end-users) and may also be different from the way the corresponding HTML pages sent to the browser are organized. For example, in some embodiments, the internal data architecture contains additional properties for each element in the page (e.g., creator, creation time, access permissions, link to templates, SEO related information, and/or the like) which are relevant for the editing and maintenance of the site in the WBS 610, but are not externally visible to end-users (or even to some editing users). The internal version of the sites may be stored in a site repository as further detailed below.

In some embodiments, a WBS 610 is used with applications. For example, a visual application is a website including pages, containers, and components. Each page is separately displayed and includes one or more components. In some embodiments, components include containers as well as atomic components. In some embodiments, the WBS 610 supports hierarchical arrangements of components using atomic components (e.g., text, image, shape, video, and/or the like) as well as various types of container components which contain other components (e.g., regular containers, single-page containers, multi-page containers, gallery containers, and/or the like). The sub-pages contained inside a container component are referred to as mini-pages, each of which may contain multiple components. Some container components may display just one of the mini-pages at a time, while others may display multiple mini-pages simultaneously.

In some examples, pages may use templates—general page templates or component templates. In an exemplary embodiment, an application master page containing components replicated in all other regular pages is a template. In another exemplary embodiments, an application header/footer, which repeats on all pages, is a template. In some embodiments, templates may be used for the complete page or page sections. A WBS 610 may provide inheritance between templates, pages or components, possibly including multi-level inheritance, multiple inheritance and diamond inheritance (i.e., A inherits from B and C, and both B and C inherit from D). In some embodiments, a WBS 610 supports site templates.

In some embodiments, the visual arrangement of components inside a page is a layout. In some embodiments, a WBS 610 supports dynamic layout processing whereby the editing of a given component (or other changes affecting it such as externally-driven content change) may affect other components. Further details regarding dynamic layout processing are described in commonly-owned U.S. Pat. No. 10,185,703, which was filed Feb. 20, 2013 as U.S. patent application Ser. No. 13/771,119, and is entitled "WEB SITE DESIGN SYSTEM INTEGRATING DYNAMIC LAYOUT AND DYNAMIC CONTENT," which patent is incorporated by reference herein in its entirety.

In some embodiments, a WBS 610 is extended using add-on applications, such as third-party applications and components, list applications, and WBS configurable applications. In certain embodiments, such add-on applications may be added and integrated into designed web sites. Such add-on applications may be purchased (or otherwise acquired) through a number of distribution mechanisms, such as being pre-included in the WBS design environment, from an application store (e.g., integrated into the WBS object marketplace 615 or external) or directly from the third-party vendor. Such third-party applications may be hosted on the servers of the WBS vendor, the servers of the third-party application's vendor, and/or a 4th party server infrastructure.

In some embodiments, a WBS 610 allows procedural code to be added to some or all of the entities (e.g., applications, pages, elements, components, and the like). Such code could be written in a standard language (such as JavaScript), an extended version of a standard language or a language proprietary to the specific WBS 610. The executed code may reference APIs provided by the WBS 610 itself or external providers. The code may also reference internal constructs and objects of the WBS 610, such as pages, components and their attributes.

In some embodiments, the procedural code elements may be activated via event triggers which may be associated with user activities (e.g., mouse move or click, page transition and/or the like), activities associated with other users (e.g., an underlying database or a specific database record being updated by another user and/or the like), system events or other types of conditions. The activated code may be executed inside the WBS's client element (e.g., client devices 508), the server platform, a combination of the two or a dynamically determined execution platform. Further details regarding activation of customized back-end functionality are described in commonly-owned U.S. Pat. No. 10,209,966, which was filed on Jul. 24, 2018 as U.S. patent application Ser. No. 16/044,461, and is entitled "CUSTOM BACK-END FUNCTIONALITY IN AN ONLINE WEBSITE BUILDING ENVIRONMENT," which patent is incorporated by reference herein in its entirety.

FIG. 8 illustrates a block diagram of an example apparatus that may be specially configured in accordance with an example embodiment of the present disclosure. In some embodiments, transactional-based concurrent editing system 510 and/or transactional-based concurrent editing server 512 is embodied by one or more computing systems, such as the apparatus 800 as depicted and described in FIG. 8.

FIG. 8 shows a schematic block diagram of example modules or circuitry, some or all of which may be included in server apparatus 800. As illustrated in FIG. 8, in accordance with some example embodiments, the server apparatus 800 may include various means, such as memory 802, processor 804, input/output module 806, communications module 808, transaction approval determination module 812, and/or object change update coordinator module 814. The server apparatus 800 may be configured, using one or more of the modules 802-814, to execute the operations regarding implementing network transactional-based concurrent editing as described above with respect to FIGS. 1-7. Said differently, systems, methods, apparatuses, and/or computer program products as described herein are configured to transform or otherwise manipulate a general purpose computer(s) so that it functions as a special purpose computer to provide network transactional-based concurrent editing, such as by parsing object change set(s), defining and/or comparing object change transaction(s), generating difference tree(s), comparing difference tree(s) and conflict handling protocol(s), updating data model(s), and/or the like.

Although the use of the terms "module" and "circuitry" as used herein with respect to components 802-814 are described in some cases using functional language, it should be understood that the particular implementations necessarily include the use of particular hardware configured to perform the functions associated with the respective module or circuitry as described herein. It should also be understood that certain of these components 802-814 may include similar or common hardware. For example, two or more modules may both leverage use of the same processor, network interface, storage medium, or the like to perform their associated functions, such that duplicate hardware is not required for each module. It will be understood in this regard that some of the components or modules described in connection with the transactional-based concurrent editing server 512, for example, may be housed within this device, while other components or modules are housed within another of these devices, or by yet another device not expressly illustrated in FIG. 5. Said differently, in some embodiments, one or more external systems (such as a remote cloud computing and/or data storage system) may also be leveraged to provide at least some of the functionality discussed herein.

While the terms "module" and "circuitry" should be understood broadly to include hardware, in some embodiments, the terms "module" and "circuitry" also include software for configuring the hardware. That is, in some embodiments, each of the modules 802-812 may be embodied by hardware, software, or a combination thereof, for performing the operations described herein. In some embodiments, some of the modules 802-812 may be embodied entirely in hardware or entirely in software, while other modules are embodied by a combination of hardware and software. For example, in some embodiments, the terms "module" and "circuitry" may include processing circuitry, storage media, network interfaces, input/output devices, and the like. In some embodiments, other elements of the server apparatus 800 may provide or supplement the functionality of a particular module or circuitry. For example, the processor 804 may provide processing functionality, the memory 802 may provide storage functionality, the communications module 808 may provide network interface functionality, and the like.

In some embodiments, one or more of the modules 802-814 may share hardware, to eliminate duplicate hardware requirements. Additionally or alternatively, in some embodiments, one or more of the modules 802-814 may be combined, such that a single module includes means configured to perform the operations of two or more of the modules 802-814. Additionally or alternatively, one or more of the modules 802-814 may be embodied by two or more submodules.

In some embodiments, the processor 804 (and/or co-processor or any other processing circuitry assisting or otherwise associated with the processor) may be in communication with the memory 802 via a bus for passing information among components of, for example, transactional-based concurrent editing server 512. The memory 802 is non-transitory and may include, for example, one or more volatile and/or non-volatile memories, or some combination thereof. In other words, for example, the memory 802 may be an electronic storage device (e.g., a non-transitory computer readable storage medium). The memory 802 may be configured to store information, data, content, applications, instructions, or the like, for enabling server apparatus 800 (e.g., transactional-based concurrent editing server 512) to carry out various functions in accordance with example embodiments of the present disclosure.

Although illustrated in FIG. 8 as a single memory, memory 802 may comprise a plurality of memory components. The plurality of memory components may be embodied on a single computing device or distributed across a plurality of computing devices. In various embodiments, memory 802 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 802 may be configured to store information, data, applications, instructions, or the like for enabling server apparatus 800 to carry out various functions in accordance with example embodiments discussed herein. For example, in at least some embodiments, memory 802 is configured to buffer data for processing by processor 804. Additionally or alternatively, in at least some embodiments, memory 802 is configured to store program instructions for execution by processor 804. Memory 802 may store information in the form of static and/or dynamic information. This stored information may be stored and/or used by the server apparatus 800 (e.g., transactional-based concurrent editing server 512) during the course of performing its functionalities.

Processor 804 may be embodied in a number of different ways and may, for example, include one or more processing devices configured to perform independently. Additionally, or alternatively, processor 804 may include one or more processors configured in tandem via a bus to enable independent execution of instructions, pipelining, and/or multi-threading. Processor 804 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 8 as a single processor, in some embodiments, processor 804 comprises a plurality of processors. The plurality of processors may be embodied on a single computing device or may be distributed across a plurality of such devices collectively configured to function as transactional-based concurrent editing server 512. The plurality of processors may be in operative communication with each other and may be collectively configured to perform one or more functionalities of transactional-based concurrent editing server 512 as described herein.

In an example embodiment, processor 804 is configured to execute instructions stored in the memory 802 or otherwise accessible to processor 804. Alternatively, or additionally, the processor 804 may be configured to execute hard-coded functionality. As such, whether configured by hardware or software methods, or by a combination thereof, the processor 804 may represent an entity (e.g., physically embodied in circuitry) capable of performing operations according to an embodiment of the present disclosure while configured accordingly. Alternatively, as another example, when the processor 804 is embodied as an executor of software instructions, the instructions may specifically configure processor 804 to perform one or more algorithms and/or operations described herein when the instructions are executed. For example, these instructions, when executed by processor 804, may cause the server apparatus 800 (e.g., transactional-based concurrent editing server 512) to perform one or more of the functionalities of system 500 as described herein.

In some embodiments, the server apparatus 800 further includes input/output module 806 that may, in turn, be in communication with processor 804 to provide an audible, visual, mechanical, or other output and/or, in some embodiments, to receive an indication of an input from a user, a client device 508, or another source. In that sense, input/output module 806 may include means for performing analog-to-digital and/or digital-to-analog data conversions. Input/output module 806 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output module 806 may comprise a user interface and may comprise a web user interface, a mobile application, a client device, a kiosk, or the like. The processor 804 and/or user interface circuitry comprising the processor 804 may be configured to control one or more functions of a display or one or more user interface elements through computer program instructions (e.g., software and/or firmware) stored on a memory accessible to the processor 804 (e.g., memory 802, and/or the like). In some embodiments, aspects of input/output module 806 may be reduced as compared to embodiments where server apparatus 800 may be implemented as an end-user machine or other type of device designed for complex user interactions. In some embodiments (like other components discussed herein), input/output module 806 may even be eliminated from server apparatus 800. Input/output module 806 may be in communication with memory 802, communications module 808, and/or any other component(s), such as via a bus. Although more than one input/output module 806 and/or other component can be included in server apparatus 800, only one is shown in FIG. 8 to avoid overcomplicating the disclosure (e.g., like the other components discussed herein).

Communications module 808, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with server apparatus 800. In this regard, communications module 808 may include, for example, a network interface for enabling communications with a wired or wireless communication network. For example, in some embodiments, communications module 808 is configured to receive and/or transmit any data that may be stored by memory 802 using any protocol that may be used for communications between computing devices. For example, communications module 808 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications module 808 includes circuitry for interacting with the antenna(s) to cause transmission of signals via the antenna(e) or to handle receipt of signals received via the antenna(e). These signals may be transmitted by transactional-based concurrent editing server 512 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications module 808 may additionally or alternatively be in communication with the memory 802, input/output module 806 and/or any other component of server apparatus 800, such as via a bus.

In some embodiments, transaction assignment module 810 is optionally included in the server apparatus 800 and configured to perform the functionality discussed herein related to, inter alia, defining object change transaction(s). In some embodiments, transaction assignment module 810 includes hardware, software, firmware, and/or a combination of such components, configured to support various aspects of such transaction assignment-related functionality, features, and/or services of the transaction assignment module 810 as described herein (e.g., receiving object change set(s), parsing object change set(s), identifying object(s), identifying object change(s), assigning object signature(s), applying object grouping protocol(s), identifying object group(s); applying transaction assignment protocol(s), defining object change transaction(s), and/or outputting object change transaction(s)). The transaction assignment module 810, in some examples, is configured to define object change transaction(s) so as to enable comparison of interrelated object changes across various users (e.g., so as to implement network transactional-based concurrent editing). In some examples, transaction assignment module 810 is configured to parse the object data set(s) into objects and associated object changes. That is, in some examples, each object data set may be broken down to identify object(s) and object change(s). In further examples, the transaction assignment module 810 is configured to apply one or more grouping protocols to the identified objects to identify object group(s) (e.g., identify any explicitly and/or implicitly related objects to each changed object identified in the object change set). In still further examples, each object is assigned an object signature to reflect a unique content of the object (e.g., to enable later comparison of objects to identify changes and/or conflicts) and the transaction assignment module 810 is configured to apply a transaction assignment protocol to define the object change transaction(s).

In some embodiments, transaction approval determination module 812 may also or instead be included and configured to perform the functionality discussed herein related to, inter alia, identifying an approved object change transaction. In some embodiments, transaction approval determination module 812 includes hardware, software, firmware, and/or a combination of such components, configured to support various aspects of such transaction approval determination-related functionality, features, and/or services of the transaction approval determination module 812 as described herein (e.g., applying a conflict handling protocol, comparing object signatures, and/or identifying common changed object(s)). For example, in some embodiments, transaction approval determination module 812 may be configured to detect and/or handle potential conflicts that include a data structure aspect, user interface layout related-aspect, a system resource-related aspect, a system-related aspect, and/or any combination of such aspects.

It should be appreciated that, in some embodiments, transaction approval determination module 812 performs one or more of such exemplary actions in combination with another module of the server apparatus 800 (e.g., transactional-based concurrent editing server 512), such as one or more of memory 802, processor 804, input/output module 806, and communications module 808. For example, in some embodiments, transaction approval determination module 812 utilizes processing circuitry, such as the processor 804 and/or the like, to perform one or more of its corresponding operations. In a further example, some or all of the functionality of transaction approval determination module 812 may be performed by processor 804 in some embodiments. In this regard, some or all of the example transaction comparing processes and algorithms discussed herein can be performed by at least one processor 804 and/or transaction approval determination module 812. It should also be appreciated that, in some embodiments, transaction approval determination module 812 may include a separate processor, specially configured field programmable gate array (FPGA), or application specific integrated circuit (ASIC) to perform its corresponding functions.

Additionally or alternatively, in some embodiments, transaction approval determination module 812 utilizes memory 802 to store collected information. For example, in some implementations, transaction approval determination module 812 includes hardware, software, firmware, and/or a combination thereof, that interacts with document repository 514 (as illustrated in FIG. 5) and/or memory 802 to send, retrieve, update, and/or store data values embodied by and/or associated with the transaction approval determination module 812 including, but not limited to, object data, object change data, document identifier(s), object identifier(s), user identifier(s), grouping protocol identifier(s), assignment protocol identifier(s), transaction identifier(s), object signature(s), and/or the like that is configured for association with, for example, identifying approved object change transactions, identifying rejected object change transactions and/or to otherwise support the operations of the transaction approval determination module 812 and the remaining circuitry. Additionally or alternatively, in some embodiments, transaction approval determination module 812 utilizes input/output module 806 to facilitate user output and/or to receive user input (e.g., user clicks, user taps, keyboard interactions, user gesture, and/or the like). Additionally or alternatively still, in some embodiments, the transaction approval determination module 812 utilizes communications module 808 to initiate transmissions to another computing device, receive transmissions from another computing device, communicate signals between the various modules as depicted, and/or the like.

In some embodiments, object change update coordinator module 814 may also or instead be included and configured to perform the functionality discussed herein related to, inter alia, updating data model(s). In some embodiments, object change update coordinator module 814 includes hardware, software, firmware, and/or a combination of such components, configured to support various aspects of such object change update coordinator-related functionality, features, and/or services of the object change update coordinator module 814 as described herein (e.g., updating data model(s)). It should be appreciated that, in some embodiments, object change update coordinator module 814 performs one or more of such exemplary actions in combination with another module of the server apparatus 800 (e.g., transactional-based concurrent editing server 512), such as one or more of memory 802, processor 804, input/output module 806, and communications module 808. For example, in some embodiments, object change update coordinator module 814 utilizes processing circuitry, such as the processor 804 and/or the like, to perform one or more of its corresponding operations. In a further example, some or all of the functionality of object change update coordinator module 814 may be performed by processor 804 in some embodiments. In this regard, some or all of the example object change update coordinating processes and algorithms discussed herein can be performed by at least one processor 804 and/or object change update coordinator module 814. It should also be appreciated that, in some embodiments, object change update coordinator module 814 may include a separate processor, specially configured field programmable gate array (FPGA), or application specific integrated circuit (ASIC) to perform its corresponding functions.

Additionally or alternatively, in some embodiments, object change update coordinator module 814 utilizes memory 802 to store collected information. For example, in some implementations, object change update coordinator module 814 includes hardware, software, firmware, and/or a combination thereof, that interacts with document repository 514, (as illustrated in FIG. 5) and/or memory 802 to send, retrieve, update, and/or store data values embodied by and/or associated with the object change update coordinator module 814 including, but not limited to, object data, object change data, document identifier(s), object identifier(s), user identifier(s), grouping protocol identifier(s), assignment protocol identifier(s), transaction identifier(s), object signature(s), and/or the like that is configured for association with, for example, updating data model(s) and/or to otherwise support the operations of the object change update coordinator module 814 and the remaining circuitry. Additionally or alternatively, in some embodiments, object change update coordinator module 814 utilizes input/output module 806 to facilitate user output and/or to receive user input (e.g., user clicks, user taps, keyboard interactions, user gesture, and/or the like). Additionally or alternatively still, in some embodiments, the object change update coordinator module 814 utilizes communications module 808 to initiate transmissions to another computing device, receive transmissions from another computing device, communicate signals between the various modules as depicted, and/or the like.

FIG. 9 illustrates a block diagram of an example client apparatus that may be specially configured in accordance with an example embodiment of the present disclosure. In some embodiments, the client device 508A-B is embodied by one or more computing systems, such as the client apparatus 900 as depicted and described in FIG. 9. The client apparatus 900 includes a memory 902, processor 904, input/output module 906, communications module 908, and/or transaction assignment module 910. The client apparatus 900 may be configured using one or more of the sets of circuitry to execute the operations described herein. The modules 902-910 may function similarly or identically to the similarly-named modules depicted and described with respect to the server apparatus 800. For purposes of brevity, repeated disclosure with regard to the functionality of such similarly-named sets of circuitry is omitted herein.

In some embodiments, transaction assignment module 910 is included in the client apparatus 900 (e.g., client device 508) and configured to perform the functionality discussed herein related to, inter alia, defining object change transaction(s). In some embodiments, transaction assignment module 910 includes hardware, software, firmware, and/or a combination of such components, configured to support various aspects of such transaction assignment-related functionality, features, and/or services of the transaction assignment module 910 as described herein (e.g., receiving object change set(s), parsing object change set(s), identifying object(s), identifying object change(s), assigning object signature(s), applying object grouping protocol(s), identifying object group(s); applying transaction assignment protocol(s), defining object change transaction(s), and/or outputting object change transaction(s)). The transaction assignment module 910, in some examples, is configured to define object change transaction(s) so as to enable comparison of interrelated object changes across various users (e.g., so as to implement network transactional-based concurrent editing). In some examples, transaction assignment module 910 is configured to parse the object data set(s) into objects and associated object changes. That is, in some examples, each object data set may be broken down to identify object(s) and object change(s). In further examples, the transaction assignment module 910 is configured to apply one or more grouping protocols to the identified objects to identify object group(s) (e.g., identify any explicitly and/or implicitly related objects to each object identified in the object change set). In still further examples, each object is assigned an object signature to reflect a unique content of the object (e.g., to enable later comparison of objects to identify changes and/or conflicts) and the transaction assignment module 910 is configured to apply a transaction assignment protocol to define the object change transaction(s).

It should be appreciated that, in some embodiments, transaction assignment module 910 performs one or more of such exemplary actions in combination with another module of the server apparatus 800, such as one or more of memory 902, processor 904, input/output module 906, and communications module 908. For example, in some embodiments, transaction assignment module 910 utilizes processing circuitry, such as the processor 904 and/or the like, to perform one or more of its corresponding operations. In a further example, some or all of the functionality of transaction assignment module 910 may be performed by processor 904 in some embodiments. In this regard, some or all of the example transaction assignment processes and algorithms discussed herein can be performed by at least one processor 904 and/or transaction assignment module 910. It should also be appreciated that, in some embodiments, transaction assignment module 910 may include a separate processor, specially configured field programmable gate array (FPGA), or application specific integrated circuit (ASIC) to perform its corresponding functions.

Additionally or alternatively, in some embodiments, transaction assignment module 910 utilizes memory 902 to store collected information. For example, in some implementations, transaction assignment module 910 includes hardware, software, firmware, and/or a combination thereof, that interacts with repository(ies) (e.g. document repository 514) and/or memory 902 to send, retrieve, update, and/or store data values embodied by and/or associated with the transaction assignment module 910 including, but not limited to, object data, object change data, document identifier(s), object identifier(s), user identifier(s), grouping protocol identifier(s), assignment protocol identifier(s), transaction identifier(s), object signature(s), and/or the like that is configured for association with, for example, defining one or more object change transaction(s), and to otherwise support the operations of the transaction assignment module 910 and the remaining circuitry. Additionally or alternatively, in some embodiments, transaction assignment module 910 utilizes input/output module 906 to facilitate user output and/or to receive user input (e.g., user clicks, user taps, keyboard interactions, user gesture, and/or the like). Additionally or alternatively still, in some embodiments, the transaction assignment module 910 utilizes communications module 908 to initiate transmissions to another computing device, receive transmissions from another computing device, communicate signals between the various modules as depicted, and/or the like.

In some embodiments, one or more of the modules 902-910 are combinable. Alternatively or additionally, in some embodiments, one or more of the modules perform some or all of the functionality described associated with another component. For example, in some embodiments, one or more of the modules 902-910 are combined into a single module embodied in hardware, software, firmware, and/or a combination thereof. Similarly, in some embodiments, one or more of the modules, for example transaction assignment module 910 is combined with the processor 904 such that the processor 904 performs one or more of the operations described above with respect to each of these modules.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Accordingly, non-transitory computer readable storage media can be configured to store firmware, one or more application programs, and/or other software, which include instructions and/or other computer-readable program code portions that can be executed to control processors of the components of server apparatus 800 and/or client apparatus 900 to implement various operations, including the examples shown herein. As such, a series of computer-readable program code portions may be embodied in one or more computer program products and can be used, with a device, database, and/or other programmable apparatus, to produce the machine-implemented processes discussed herein. It is also noted that all or some of the information discussed herein can be based on data that is received, generated and/or maintained by one or more components of the transactional-based concurrent editing server 512 and/or client device 508. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of transactional-based concurrent editing server 512 and client device 508.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device can be received from the client device at the server.

The following exemplary embodiments are provided, the numbering of which is not to be construed as designating levels of importance or relevance.

Embodiment 1 provides a system for implementing network transactional-based concurrent editing of a document by two or more users is provided, the system comprising one or more transaction assignment modules configured to parse a first object change set originating from a first user device and a second object change set originating from a second user device to define at least two object change transactions, wherein the first object change set and the second object change set are associated with a selected document, the selected document associated with a data model comprising one or more objects, a transaction approval determination module configured to identify at least one of the at least two object change transactions as an approved object change transaction based on application of a conflict handling protocol, and an object change update coordinator configured to update the data model of the selected document with the at least one approved object change transaction.

Embodiment 2 provides the system of Embodiment 1, wherein the one or more transaction assignment modules comprise client-side software applications respectively running on the first user device and the second user device.

Embodiment 3 provides the system of any one of Embodiments 1-2, wherein a server apparatus is in communication with the first user device and the second user device and wherein the transaction assignment module comprises at least a server-side application running on the server apparatus.

Embodiment 4 provides the system of any one of Embodiments 1-3, wherein the system is associated with a visual design system, wherein the visual design system is one or more of a document building system, a website building system, or an application building system.

Embodiment 5 provides the system of any one of Embodiments 1-4, wherein at least one other of the at least two object change transactions that is not updated to the data model is assigned a rejected status.

Embodiment 6 provides the system of any one of Embodiments 1-5, wherein the one or more objects of the data model are associated with at least one document data structure, the at least one document data structure comprises one or more of a tree-structured data structure, a graph data structure, a referential table, an object database, a flat data structure, or a hash table.

Embodiment 7 provides the system of any one of Embodiments 1-6, wherein the one or more objects of the at least one document data structure comprises one or more of a component, a container, or a combination thereof.

Embodiment 8 provides the system of any one of Embodiments 1-7, wherein defining the at least two object change transactions comprises defining a first object change transaction for the first object change set and a second object change transaction for the second object change set.

Embodiment 9 provides the system of any one of Embodiments 1-8, wherein the first object change transaction comprises one or more objects changed by a user associated with the first user device and the second object change transaction comprises one or more objects changed by a user associated with the second user device.

Embodiment 10 provides the system of any one of Embodiments 1-9, wherein each object of the at least two object change transactions is associated with an object signature, the object signature corresponding to a candidate changed component, the candidate changed component reflecting a changed object after application of one or more object changes by the user of the respective user device.

Embodiment 11 provides the system of any one of Embodiments 1-10, wherein the transaction assignment module assigns the object signature to each object based on an algorithmic transformation of at least one of a content field, a position field, a color field, a size field, a formatting field, a user field, or a change timestamp.

Embodiment 12 provides the system of any one of Embodiments 1-11, wherein each object of the at least two object change transactions is associated with a prior object signature, the prior object signature corresponding to a content of the object prior to application of the one or more object changes by the user of the respective user device.

Embodiment 13 provides the system of any one of Embodiments 1-12, wherein the transaction approval determination module comprises an order enforcer module, the order enforcer module configured to generate an ordered object change transaction stream in a data store based on programmatically determining an order of the at least two object change transactions.

Embodiment 14 provides the system of any one of Embodiments 1-13, wherein the transaction approval determination module is configured to compare a baselined object signature in the data store with a prior object signature of a first ordered object change transaction in the data store, the baselined object signature and the prior object signature corresponding to a common object.

Embodiment 15 provides the system of any one of Embodiments 1-14, wherein the baselined object signature and the prior object signature for each object of the first ordered object change transaction are the same.

Embodiment 16 provides the system of any one of Embodiments 1-15, wherein the first ordered object change transaction is approved by the transaction approval determination module based on the application of the conflict handling protocol.

Embodiment 17 provides the system of any one of Embodiments 1-16, wherein the transaction approval determination module is configured to compare a baselined object signature in the data store with a prior object signature of a second ordered object change transaction, the baselined object signature and the prior object signature corresponding to a common object.

Embodiment 18 provides the system of any one of Embodiments 1-17, wherein the baselined object signature and the prior object signature for at least one object of the second ordered object change transaction are different.

Embodiment 19 provides the system of any one of Embodiments 1-18, wherein the second ordered object change transaction is rejected by the transaction approval determination module based on the application of the conflict handling protocol.

Embodiment 20 provides the system of any one of Embodiments 1-19, wherein the first object change transaction is the approved object change transaction based on the application of the conflict handling protocol such that the object change update coordinator updates the data model with the first object change transaction.

Embodiment 21 provides the system of any one of Embodiments 1-20 further comprising an output module configured to cause rendering of a first updated document interface to the second user device, wherein the first updated document interface indicates replacement of a candidate changed component corresponding to implementation of the second object change transaction with an approved changed component, wherein the approved changed component embodies an approved change corresponding to implementation of the first object change transaction.

Embodiment 22 provides the system of any one of Embodiments 1-21 further comprising an output module configured to cause rendering of a user notification interface component to the second user device following replacement of the candidate changed component corresponding to implementation of the second object change transaction with the approved changed component, wherein the user notification interface component indicates that the second object change transaction is not updated to the data model.

Embodiment 23 provides the system of any one of Embodiments 1-22 further comprising an output module configured to cause rendering of a communication interface component to each of the first user device and the second user device, the communication interface component configured to enable one or more communications between the first user device and the second user device.

Embodiment 24 provides a method for implementing network transactional-based concurrent editing of a document by two or more users, the method comprising parsing a first object change set originating from a first user device and a second object change set originating from a second user device to define at least two object change transactions, wherein the first object change set and the second object change set are associated with a selected document, the selected document associated with a data model comprising one or more objects, identifying at least one of the at least two object change transactions as an approved object change transaction based on application of a conflict handling protocol, and updating the data model of the selected document with the at least one approved object change transaction.

Embodiment 25 provides the method of Embodiment 24, wherein client-side software applications respectively running on the first user device and the second user device define the at least two object transactions.

Embodiment 26 provides the method of any one of Embodiments 24-25, wherein a server apparatus is in communication with the first user device and the second user device and wherein a server-side application running on the server apparatus defines the at least two object transactions.

Embodiment 27 provides the method of any one of Embodiments 24-26, wherein the method is associated with a visual design system, wherein the visual design system is one or more of a document building system, a website building system, or an application building system.

Embodiment 28 provides the method of any one of Embodiments 24-27, further comprising assigning a rejected status to at least one other of the at least two object change transactions that is not updated to the data model.

Embodiment 29 provides the method of any one of Embodiments 24-28, wherein the one or more objects of the data model are associated with at least one document data structure, the at least one document data structure comprises one or more of a tree-structured data structure, a graph data structure, a referential table, an object database, a flat data structure, or a hash table.

Embodiment 30 provides the method of any one of Embodiments 24-29, wherein the one or more objects of the at least one document data structure comprises one or more of a component, a container, or a combination thereof.

Embodiment 31 provides the method of any one of Embodiments 24-30, wherein defining the at least two object change transactions comprises defining a first object change transaction for the first object change set and a second object change transaction for the second object change set.

Embodiment 32 provides the method of any one of Embodiments 24-31, wherein the first object change transaction comprises one or more objects changed by a user associated with the first user device and the second object change transaction comprises one or more objects changed by a user associated with the second user device.

Embodiment 33 provides the method of any one of Embodiments 24-32, wherein each object of the at least two object change transactions is associated with an object signature, the object signature corresponding to a candidate changed component, the candidate changed component reflecting a changed object after application of one or more object changes by the user of the respective user device.

Embodiment 34 provides the method of any one of Embodiments 24-33 wherein defining the at least two object change transactions comprises assigning the object signature to each object based on an algorithmic transformation of at least one of a content field, a position field, a color field, a size field, a formatting field, a user field, or a change timestamp.

Embodiment 35 provides the method of any one of Embodiments 24-34, wherein each object of the at least two object change transactions is associated with a prior object signature, the prior object signature corresponding to a content of the object prior to application of the one or more object changes by the user of the respective user device.

Embodiment 36 provides the method of any one of Embodiments 24-35, wherein identifying at least one of the at least two object change transactions as an approved object change transaction comprises generating an ordered object change transaction stream in a data store based on programmatically determining an order of the at least two object change transactions.

Embodiment 37 provides the method of any one of Embodiments 24-36, wherein identifying at least one of the at least two object change transactions as an approved object comprises comparing a baselined object signature in the data store with a prior object signature of a first ordered object change transaction in the data store, the baselined object signature and the prior object signature corresponding to a common object.

Embodiment 38 provides the method of any one of Embodiments 24-37, wherein the baselined object signature and the prior object signature for each object of the first ordered object change transaction are the same.

Embodiment 39 provides the method of any one of Embodiments 24-38, wherein identifying at least one of the at least two object change transactions as an approved object change transaction comprises approving the first ordered object change transaction based on the application of the conflict handling protocol.

Embodiment 40 provides the method of any one of Embodiments 24-39, wherein identifying at least one of the at least two object change transactions as an approved object comprises comparing a baselined object signature in the data store with a prior object signature of a second ordered object change transaction, the baselined object signature and the prior object signature corresponding to a common object.

Embodiment 41 provides the method of any one of Embodiments 24-40, wherein the baselined object signature and the prior object signature for at least one object of the second ordered object change transaction are different.

Embodiment 42 provides the method of any one of Embodiments 24-41, further comprising rejecting the second ordered object change transaction based on the application of the conflict handling protocol.

Embodiment 43 provides the method of any one of Embodiments 24-44, wherein the first object change transaction is the approved object change transaction based on the application of the conflict handling protocol such that updating the data model of the selected document with the at least one approved object change transaction comprises applying the first object change transaction to the data model.

Embodiment 44 provides the method of any one of Embodiments 24-43, further comprising causing rendering of a first updated document interface to the second user device, wherein the first updated document interface indicates replacement of a candidate changed component corresponding to implementation of the second object change transaction with an approved changed component, and wherein the approved changed component embodies an approved change corresponding to implementation of the first object change transaction.

Embodiment 45 provides the method of any one of Embodiments 24-44, further comprising causing rendering of a user notification interface component to the second user device following replacement of a candidate changed component corresponding to implementation of the second object change transaction with an approved changed component, wherein the user notification interface component indicates that the second object change transaction is not updated to the data model.

Embodiment 46 provides the method of any one of Embodiments 24-45, further comprising causing rendering of a communication interface component to each of the first user device and the second user device, the communication interface component configured to enable one or more communications between the first user device and the second user device.

Embodiment 47 provides a computer program product comprising at least one non-transitory computer-readable storage medium having computer program code stored thereon that, in execution with at least one processor is configured to parse a first object change set originating from a first user device and a second object change set originating from a second user device to define at least two object change transactions, wherein the first object change set and the second object change set are associated with a selected document, the selected document associated with a data model comprising one or more objects, identify at least one of the at least two object change transactions as an approved object change transaction based on application of a conflict handling protocol, and update the data model of the selected document with the at least one approved object change transaction.

Embodiment 48 provides the computer program product of Embodiment 47, wherein client-side software applications respectively running on the first user device and the second user device define the at least two object transactions.

Embodiment 49 provides the computer program product of any one of Embodiments 47-48, wherein a server apparatus is in communication with the first user device and the second user device and wherein a server-side application running on the server apparatus defines the at least two object transactions.

Embodiment 50 provides the computer program product of any one of Embodiments 47-49, wherein the computer program product is associated with a visual design system, wherein the visual design system is one or more of a document building system, a website building system, or an application building system.

Embodiment 51 provides the computer program product of any one of Embodiments 47-50, further configured to cause the computer to assign a rejected status to at least one other of the at least two object change transactions that is not updated to the data model.

Embodiment 52 provides the computer program product of any one of Embodiments 47-51, wherein the one or more objects of the data model are associated with at least one document data structure, the at least one document data structure comprises one or more of a tree-structured data structure, a graph data structure, a referential table, an object database, a flat data structure, or a hash table.

Embodiment 53 provides the computer program product of any one of Embodiments 47-52, wherein the one or more objects of the at least one document data structure comprises one or more of a component, a container, or a combination thereof.

Embodiment 54 provides the computer program product of any one of Embodiments 47-53, wherein defining the at least two object change transactions comprises defining a first object change transaction for the first object change set and a second object change transaction for the second object change set.

Embodiment 55 provides the computer program product of any one of Embodiments 47-54, wherein the first object change transaction comprises one or more objects changed by a user associated with the first user device and the second object change transaction comprises one or more objects changed by a user associated with the second user device.

Embodiment 56 provides the computer program product of any one of Embodiments 47-55, wherein each object of the at least two object change transactions is associated with an object signature, the object signature corresponding to a candidate changed component, the candidate changed component reflecting a changed object after application of one or more object changes by the user of the respective user device.

Embodiment 57 provides the computer program product of any one of Embodiments 47-56, wherein defining the at least two object change transactions comprises assigning the object signature to each object based on an algorithmic transformation of at least one of a content field, a position field, a color field, a size field, a formatting field, a user field, or a change timestamp.

Embodiment 58 provides the computer program product of any one of Embodiments 47-57, wherein each object of the at least two object change transactions is associated with a prior object signature, the prior object signature corresponding to a content of the object prior to application of the one or more object changes by the user of the respective user device.

Embodiment 59 provides the computer program product of any one of Embodiments 47-58, wherein identifying at least one of the at least two object change transactions as an approved object change transaction comprises generating an ordered object change transaction stream in a data store based on programmatically determining an order of the at least two object change transactions.

Embodiment 60 provides the computer program product of any one of Embodiments 47-59, wherein identifying at least one of the at least two object change transactions as an approved object comprises comparing a baselined object signature in the data store with a prior object signature of a first ordered object change transaction in the data store, the baselined object signature and the prior object signature corresponding to a common object.

Embodiment 61 provides the computer program product of any one of Embodiments 47-60, wherein the baselined object signature and the prior object signature for each object of the first ordered object change transaction are the same.

Embodiment 62 provides the computer program product of any one of Embodiments 47-61, wherein identifying at least one of the at least two object change transactions as an approved object change transaction comprises approving the first ordered object change transaction based on the application of the conflict handling protocol.

Embodiment 63 provides the computer program product of any one of Embodiments 47-62, wherein identifying at least one of the at least two object change transactions as an approved object comprises comparing a baselined object signature in the data store with a prior object signature of a second ordered object change transaction, the baselined object signature and the prior object signature corresponding to a common object.

Embodiment 64 provides the computer program product of any one of Embodiments 47-63, wherein the baselined object signature and the prior object signature for at least one object of the second ordered object change transaction are different.

Embodiment 65 provides the computer program product of any one of Embodiments 47-64, further comprising rejecting the second ordered object change transaction based on the application of the conflict handling protocol.

Embodiment 66 provides the computer program product of any one of Embodiments 47-65, wherein the first object change transaction is the approved object change transaction based on the application of the conflict handling protocol such that updating the data model of the selected document with the at least one approved object change transaction comprises applying the first object change transaction to the data model.

Embodiment 67 provides the computer program product of any one of Embodiments 47-66, further configured to cause rendering of a first updated document interface to the second user device, wherein the first updated document interface indicates replacement of a candidate changed component corresponding to implementation of the second object change transaction with an approved changed component, and wherein the approved changed component embodies an approved change corresponding to implementation of the first object change transaction.

Embodiment 68 provides the computer program product of any one of Embodiments 47-67, further configured to cause rendering of a user notification interface component to the second user device following replacement of a candidate changed component corresponding to implementation of the second object change transaction with an approved changed component, wherein the user notification interface component indicates that the second object change transaction is not updated to the data model.

Embodiment 69 provides the computer program product of any one of Embodiments 47-68, further configured to cause rendering of a communication interface component to each of the first user device and the second user device, the communication interface component configured to enable one or more communications between the first user device and the second user device.

Embodiment 70 provides a system for implementing network transactional-based concurrent editing of a document, the system comprising a transaction assignment module configured to receive at least one object change set originating from at least one change interface session, wherein the at least one object change set is associated with a selected document, parse the at least one object change set to identify one or more objects, one or more object changes, and one or more object groups in the at least one object change set, apply a transaction assignment protocol to the one or more object groups to define at least one object change transaction, and output the at least one object change transaction to a transaction approval determination module.

Embodiment 71 provides the system of Embodiment 70, wherein the at least one change interface session comprises a first change interface session associated with a first web browser tab associated with a first user device and a second change interface session associated with a second web browser tab associated with the first user device.

Embodiment 72 provides the system of any one Embodiments 70-71, wherein the at least one change interface session comprises a first change interface session associated with a first user device and a second change interface session associated with a second user device Embodiment 73 provides the system of any one Embodiments 70-72, wherein the one or more object groups are identified based on application of one or more object grouping protocols, wherein the one or more grouping protocols comprise one or more of a contextual relationship protocol, a hierarchical data structure protocol, an anchor relationship protocol, a geometrical relationship protocol, or a semantic relationship protocol, each object grouping protocol defining grouping criteria for identifying a relationship between at least two objects of the one or more objects.

Embodiment 74 provides the system of any one Embodiments 70-73, wherein at least one identified relationship is predefined.

Embodiment 75 provides the system of any one Embodiments 70-74, wherein at least one identified relationship is programmatically generated at run-time.

Embodiment 76 provides the system of any one Embodiments 70-75, wherein the transaction assignment protocol is configured to define a first object transaction comprising a single object of the one or more objects in an instance wherein application of the one or more object grouping protocols does not identify an applicable relationship between the single object and another object of the one or more objects.

Embodiment 77 provides the system of any one Embodiments 70-76, wherein a first object change transaction of the at least one object change transaction comprises a single object associated with a single object change.

Embodiment 78 provides the system of any one Embodiments 70-77, wherein a first object change transaction of the at least one object change transaction comprises two or more objects associated with two or more object changes.

Embodiment 79 provides the system of any one Embodiments 70-78, wherein a first object change set of the at least one object change set comprises a single object change to a single object.

Embodiment 80 provides the system of any one Embodiments 70-79, wherein a first object change set of the at least one object change set comprises a plurality of object changes to a plurality of objects.

Embodiment 81 provides the system of any one Embodiments 70-80, wherein the one or more object changes of the at least one object change set comprises at least one of a component size change, a component position change, a component content change, a component content formatting change, a container size change, a container position change, a container content change, a container content formatting change, or a re-parenting of a component.

Embodiment 82 provides a method for implementing network transactional-based concurrent editing of a document, the method comprising receiving at least one object change set originating from at least one change interface session, wherein the at least one object change set is associated with a selected document, parsing the at least one object change set to identify one or more objects, one or more object changes, and one or more object groups in the at least one object change set, applying a transaction assignment protocol to the one or more object groups to define at least one object change transaction, and outputting the at least one object change transaction to a transaction approval determination module.

Embodiment 83 provides the method of Embodiment 82, wherein the at least one change interface session comprises a first change interface session associated with a first web browser tab associated with a first user device and a second change interface session associated with a second web browser tab associated with the first user device.

Embodiment 84 provides the method of any one of Embodiments 82-83, wherein the at least one change interface session comprises a first change interface session associated with a first user device and a second change interface session associated with a second user device.

Embodiment 85 provides the method of any one of Embodiments 82-84, wherein the one or more object groups are identified based on application of one or more object grouping protocols, wherein the one or more grouping protocols comprise one or more of a contextual relationship protocol, a hierarchical data structure protocol, an anchor relationship protocol, a geometrical relationship protocol, or a semantic relationship protocol, each object grouping protocol defining grouping criteria for identifying a relationship between at least two objects of the one or more objects.

Embodiment 86 provides the method of any one of Embodiments 82-85, wherein at least one identified relationship is predefined.

Embodiment 87 provides the method of any one of Embodiments 82-86, wherein at least one identified relationship is programmatically generated at run-time.

Embodiment 88 provides the method of any one of Embodiments 82-87, wherein the transaction assignment protocol is configured to define a first object transaction comprising a single object of the one or more objects in an instance wherein application of the one or more object grouping protocols does not identify an applicable relationship between the single object and another object of the one or more objects.

Embodiment 89 provides the method of any one of Embodiments 82-88, wherein a first object change transaction of the at least one object change transaction comprises a single object associated with a single object change.

Embodiment 90 provides the method of any one of Embodiments 82-89, wherein a first object change transaction of the at least one object change transaction comprises two or more objects associated with two or more object changes.

Embodiment 91 provides the method of any one of Embodiments 82-90, wherein a first object change set of the at least one object change set comprises a single object change to a single object.

Embodiment 92 provides the method of any one of Embodiments 82-91, wherein a first object change set of the at least one object change set comprises a plurality of object changes to a plurality of objects.

Embodiment 93 provides the method of any one of Embodiments 82-92, wherein the one or more object changes of the at least one object change set comprises at least one of a component size change, a component position change, a component content change, a component content formatting change, a container size change, a container position change, a container content change, a container content formatting change, or a re-parenting of a component.

Embodiment 94 provides a computer program product comprising at least one non-transitory computer-readable storage medium having computer program code stored thereon that, in execution with at least one processor is configured to receive at least one object change set originating from at least one change interface session, wherein the at least one object change set is associated with a selected document, parse the at least one object change set to identify one or more objects, one or more object changes, and one or more object groups in the at least one object change set, apply a transaction assignment protocol to the one or more object groups to define at least one object change transaction, and output the at least one object change transaction to a transaction approval determination module.

Embodiment 95 provides the computer program product of Embodiment 94, wherein the at least one change interface session comprises a first change interface session associated with a first web browser tab associated with a first user device and a second change interface session associated with a second web browser tab associated with the first user device.

Embodiment 96 provides the computer program product of any one of Embodiments 94-95, wherein the at least one change interface session comprises a first change interface session associated with a first user device and a second change interface session associated with a second user device.

Embodiment 97 provides the computer program product of any one of Embodiments 94-96, wherein the one or more object groups are identified based on application of one or more object grouping protocols, wherein the one or more grouping protocols comprise one or more of a contextual relationship protocol, a hierarchical data structure protocol, an anchor relationship protocol, a geometrical relationship protocol, or a semantic relationship protocol, each object grouping protocol defining grouping criteria for identifying a relationship between at least two objects of the one or more objects.

Embodiment 98 provides the computer program product of any one of Embodiments 94-97, wherein at least one identified relationship is predefined.

Embodiment 99 provides the computer program product of any one of Embodiments 94-98, wherein at least one identified relationship is programmatically generated at runtime.

Embodiment 100 provides the computer program product of any one of Embodiments 94-99, wherein the transaction assignment protocol is configured to define a first object transaction comprising a single object of the one or more objects in an instance wherein application of the one or more object grouping protocols does not identify an applicable relationship between the single object and another object of the one or more objects.

Embodiment 101 provides the computer program product of any one of Embodiments 94-100, wherein a first object change transaction of the at least one object change transaction comprises a single object associated with a single object change.

Embodiment 102 provides the computer program product of any one of Embodiments 94-101, wherein a first object change transaction of the at least one object change transaction comprises two or more objects associated with two or more object changes.

Embodiment 103 provides the computer program product of any one of Embodiments 94-102, wherein a first object change set of the at least one object change set comprises a single object change to a single object.

Embodiment 104 provides the computer program product of any one of Embodiments 94-103, wherein a first object change set of the at least one object change set comprises a plurality of object changes to a plurality of objects.

Embodiment 105 provides the computer program product of any one of Embodiments 94-104, wherein the one or more object changes of the at least one object change set comprises at least one of a component size change, a component position change, a component content change, a component content formatting change, a container size change, a container position change, a container content change, a container content formatting change, or a re-parenting of a component.

Embodiment 106 provides an apparatus for implementing network transactional-based concurrent editing of a document, the apparatus comprising at least one processor, and at least one non-transitory memory including program code, the at least one non-transitory memory and the program code configured to, with the at least one processor, cause the apparatus to cause rendering of a selected document to a document editing interface, detect a candidate change to a component of the selected document, update the document editing interface to replace the component with a candidate changed component, the candidate changed component reflecting application of the candidate change to the component, and update the document editing interface to replace the candidate changed component with an approved changed component triggered following application of a conflict handling protocol, wherein the approved changed component embodies an approved change to the component of the selected document that differs from the candidate change.

Embodiment 107 provides the apparatus of Embodiment 106, wherein the candidate changed component is associated with a visual emphasis element corresponding to a tentative state of the candidate changed component.

Embodiment 108 provides the apparatus of any one of Embodiments 106-107, wherein the approved changed component is associated with a visual emphasis element corresponding to an approved state of the approved changed component.

Embodiment 109 provides the apparatus of any one of Embodiments 106-108, wherein the visual emphasis element is a change emphasis element.

Embodiment 110 provides a method for implementing network transactional-based concurrent editing of a document, the method comprising causing rendering of a selected document to a document editing interface, detecting a candidate change to a component of the selected document, updating the document editing interface to replace the component with a candidate changed component, the candidate changed component reflecting application of the candidate change to the component, and updating the document editing interface to replace the candidate changed component with an approved changed component triggered following application of a conflict handling protocol, wherein the approved changed component embodies an approved change to the component of the selected document that differs from the candidate change.

Embodiment 111 provides the method of Embodiment 110, wherein the candidate changed component is associated with a visual emphasis element corresponding to a tentative state of the candidate changed component.

Embodiment 112 provides the method of any one of Embodiments 110-111, wherein the approved changed component is associated with a visual emphasis element corresponding to an approved state of the approved changed component.

Embodiment 113 provides the method of any one of Embodiments 110-112, wherein the visual emphasis element is a change emphasis element.

Embodiment 114 provides a computer program product comprising at least one non-transitory computer-readable storage medium having computer program code stored thereon that, in execution with at least one processor is configured to cause rendering of a selected document to a document editing interface, detect a candidate change to a component of the selected document, update the document editing interface to replace the component with a candidate changed component, the candidate changed component reflecting application of the candidate change to the component, and update the document editing interface to replace the candidate changed component with an approved changed component triggered following application of a conflict handling protocol, wherein the approved changed component embodies an approved change to the component of the selected document that differs from the candidate change.

Embodiment 115 provides the computer program product of Embodiment 114, wherein the candidate changed component is associated with a visual emphasis element corresponding to a tentative state of the candidate changed component.

Embodiment 116 provides the computer program product of any one of Embodiments 114-115, wherein the approved changed component is associated with a visual emphasis element corresponding to an approved state of the approved changed component.

Embodiment 117 provides the computer program product of any one of Embodiments 114-116, wherein the visual emphasis element is a change emphasis element.

Embodiment 118 provides the system of any one of Embodiments 1-23, wherein at least one of a potential user-interface layout-related conflict, a potential system resource-related conflict, or a potential system-related conflict is detected among the at least two object change transactions.

Embodiment 119 provides the system of Embodiment 118, wherein a potential user interface layout-related conflict is detected among the at least two object change transactions and the conflict handling protocol is a user interface layout-related conflict handling protocol.

Embodiment 120 provides the system of any one of Embodiments 118-119, wherein a first object change transaction comprises at least a first object changed by a user associated with the first user device and a second object change transaction comprises at least a second object changed by a user associated with the second user device.

Embodiment 121 provides the system of any one of Embodiments 118-120, wherein the first object and the second object are overlapping such that the potential user-interface layout-related conflict is based on the first object change transaction and the second object change transaction changing a design or a layout of the first object and the second object in a conflicting manner.

Embodiment 122 provides the system of any one of Embodiments 118-121, wherein a potential system resource-related conflict is detected among the at least two object change transactions and the conflict handling protocol is a system resource-related conflict handling protocol.

Embodiment 123 provides the system of any one of Embodiments 118-122, wherein a first object change transaction comprises at least a first object changed by a user associated with the first user device and a second object change transaction comprises at least a second object changed by a user associated with the second user device.

Embodiment 124 provides the system of any one of Embodiments 118-123, wherein the first object and the second object are resource-related objects and the potential system resource-related conflict is based on the first object change transaction and the second object change transaction connecting the first object and the second object to a single resource or set of resources in a conflicting manner during operation.

Embodiment 125 provides the system of any one of Embodiments 118-124, wherein a potential system-related conflict is detected among the at least two object change transactions and the conflict handling protocol is a system-related conflict handling protocol.

Embodiment 126 provides the system of any one of Embodiments 118-125, wherein the potential system-related conflict corresponds to a layout-related impact on multiple entities as a result of a system upgrade.

Embodiment 127 provides the system of any one of Embodiments 1-23 or 118-126, wherein application of the conflict handling protocol comprises merging two or more object change transactions of the at least two object change transactions.

Embodiment 128 provides the system of any one of Embodiments 1-23 or 118-127, wherein application of the conflict handling protocol further comprises creating a modified merged object change transaction, the modified merged object change transaction integrating one or more modified object changes from the two or more object change transactions.

Embodiment 129 provides the system of any one of Embodiments 1-23 or 118-128, wherein application of the conflict handling protocol comprises splitting one or more of the at least two object change transactions.

Embodiment 130 provides the system of any one of Embodiments 1-23 or 118-129, wherein application of the conflict handling protocol comprises updating a different object not associated with the first object change set or the second object change set.

Embodiment 131 provides the system of any one of Embodiments 1-23 or 118-130, wherein the transaction approval determination module comprises one or more trained machine learning models and application of the conflict handling protocol comprises application of at least one trained machine learning model to identify the at least one approved object change transaction.

Embodiment 132 provides the system of any one of Embodiments 1-23 or 118-131, wherein application of the conflict handling protocol comprises accessing one or more rules from a rules repository to identify the at least one approved object change transaction.

Embodiment 133 provides the system of any one of Embodiments 1-23 or 118-132, wherein application of the conflict handling protocol comprises generating a new object change transaction.

Embodiment 134 provides the system of Embodiment 133, wherein the new object change transaction comprises an inverse content of at least a first object change transaction of the at least two object change transactions such that the object change update coordinator reverts the data model to a state without the first object change transaction.

Embodiment 135 provides the system of any one of Embodiments 1-10, wherein application of the conflict handling protocol comprises assigning at least one new object signature to at least one object of at least one of the two object change transactions and resubmitting the at least two object change transactions to the transaction approval determination module.

Embodiment 136 provides the system of any one of Embodiments 1-23 or 118-135, wherein the first object change set adds a first child object to a parent object, wherein the second object change data adds a second child object to the parent object, and wherein the data model associated with the selected document is an alternate data model wherein each child object contains a reference to the parent object such that application of the conflict handling protocol does not identify a potential conflict with respect to the parent object and the transaction approval determination module is configured to identify the at least two object change transactions as approved object change transactions.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system for implementing network transactional-based concurrent editing of a document, the system comprising:
 a transaction assignment module configured to:
  receive at least one object change set originating from at least one change interface session, wherein the at least one object change set is associated with a selected document;
  parse the at least one object change set to identify one or more objects, one or more object changes, and one or more object groups in the at least one object change set, wherein at least a first object group comprises at least a first object subject to an object change and at least a second, different object that is not subject to an object change;
  apply a transaction assignment protocol to the one or more object groups to define at least one object change transaction; and
  output the at least one object change transaction to a transaction approval determination module.

2. The system of claim 1, wherein the at least one change interface session comprises a first change interface session associated with a first web browser tab associated with a first user device and a second change interface session associated with a second web browser tab associated with the first user device.

3. The system of claim 1, wherein the at least one change interface session comprises a first change interface session associated with a first user device and a second change interface session associated with a second user device.

4. The system of claim 1, wherein the one or more object groups are identified based on application of one or more object grouping protocols, wherein the one or more object grouping protocols comprise one or more of a contextual relationship protocol, a hierarchical data structure protocol, an anchor relationship protocol, a geometrical relationship protocol, or a semantic relationship protocol, each object grouping protocol defining grouping criteria for identifying a relationship between at least two objects of the one or more objects.

5. The system of claim 4, wherein at least one identified relationship is predefined or programmatically generated at run-time.

6. The system of claim 4, wherein the transaction assignment protocol is configured to define a first object transaction comprising a single object of the one or more objects in an instance wherein application of the one or more object grouping protocols does not identify an applicable relationship between the single object and another object of the one or more objects.

7. The system of claim 1, wherein a first object change transaction of the at least one object change transaction comprises a single object associated with a single object change or two or more objects associated with two or more object changes.

8. The system of claim 1, wherein a first object change set of the at least one object change set comprises a single object change to a single object or a plurality of object changes to a plurality of objects.

9. The system of claim 1, wherein the one or more object changes of the at least one object change set comprises at least one of a component size change, a component position change, a component content change, a component content formatting change, a container size change, a container position change, a container content change, a container content formatting change, or a re-parenting of a component.

10. A method for implementing network transactional-based concurrent editing of a document, the method comprising:
 receiving at least one object change set originating from at least one change interface session, wherein the at least one object change set is associated with a selected document;
 parsing the at least one object change set to identify one or more objects, one or more object changes, and one or more object groups in the at least one object change set, wherein at least a first object group comprises at least a first object subject to an object change and at least a second, different object that is not subject to an object change;

applying a transaction assignment protocol to the one or more object groups to define at least one object change transaction; and outputting the at least one object change transaction to a transaction approval determination module.

11. The method of claim 10, wherein the at least one change interface session comprises a first change interface session associated with a first web browser tab associated with a first user device and a second change interface session associated with a second web browser tab associated with the first user device.

12. The method of claim 10, wherein the at least one change interface session comprises a first change interface session associated with a first user device and a second change interface session associated with a second user device.

13. The method of claim 10, wherein the one or more object groups are identified based on application of one or more object grouping protocols, wherein the one or more object grouping protocols comprise one or more of a contextual relationship protocol, a hierarchical data structure protocol, an anchor relationship protocol, a geometrical relationship protocol, or a semantic relationship protocol, each object grouping protocol defining grouping criteria for identifying a relationship between at least two objects of the one or more objects.

14. The method of claim 13, wherein at least one identified relationship is predefined or programmatically generated at run-time.

15. The method of claim 13, wherein the transaction assignment protocol is configured to define a first object transaction comprising a single object of the one or more objects in an instance wherein application of the one or more object grouping protocols does not identify an applicable relationship between the single object and another object of the one or more objects.

16. The method of claim 10, wherein a first object change transaction of the at least one object change transaction comprises a single object associated with a single object change or two or more objects associated with two or more object changes.

17. The method of claim 10, wherein a first object change set of the at least one object change set comprises a single object change to a single object.

18. The method of claim 10, wherein a first object change set of the at least one object change set comprises a plurality of object changes to a plurality of objects.

19. The method of claim 10, wherein the one or more object changes of the at least one object change set comprises at least one of a component size change, a component position change, a component content change, a component content formatting change, a container size change, a container position change, a container content change, a container content formatting change, or a re-parenting of a component.

20. A computer program product comprising at least one non-transitory computer-readable storage medium having computer program code stored thereon that, in execution with at least one processor is configured to:

receive at least one object change set originating from at least one change interface session, wherein the at least one object change set is associated with a selected document;

parse the at least one object change set to identify one or more objects, one or more object changes, and one or more object groups in the at least one object change set, wherein at least a first object group comprises at least a first object subject to an object change and at least a second, different object that is not subject to an object change;

apply a transaction assignment protocol to the one or more object groups to define at least one object change transaction; and output the at least one object change transaction to a transaction approval determination module.

* * * * *